(12) United States Patent
Cragun et al.

(10) Patent No.: US 6,324,553 B1
(45) Date of Patent: Nov. 27, 2001

(54) APPARATUS AND METHOD FOR THE MANUAL SELECTIVE BLOCKING OF IMAGES

(75) Inventors: Brian John Cragun; Paul Reuben Day, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/979,132

(22) Filed: Nov. 26, 1997

(51) Int. Cl.⁷ .................................................. G06F 7/00
(52) U.S. Cl. ........................................ 707/513; 707/501.1
(58) Field of Search ...................... 707/501, 513, 707/502; 345/339, 349, 121

(56) References Cited

U.S. PATENT DOCUMENTS

| | | | |
|---|---|---|---|
| 5,339,389 | * 8/1994 | Bates et al. | 345/331 |
| 5,826,025 | 10/1998 | Gramlich | 709/217 |
| 5,835,722 | * 11/1998 | Bradshaw et al. | 709/225 |
| 5,845,084 | * 12/1998 | Cordell et al. | 709/234 |
| 5,848,418 | * 12/1998 | Desouza et al. | 707/102 |
| 5,860,074 | 1/1999 | Rowe et al. | 707/526 |
| 5,862,325 | * 1/1999 | Reed et al. | 709/201 |
| 5,870,559 | * 2/1999 | Leshem et al. | 709/224 |
| 5,890,164 | 3/1999 | Nielsen | 707/201 |
| 5,890,172 | * 3/1999 | Borman et al. | 707/501 |
| 5,893,109 | * 4/1999 | Derose et al. | 707/104 |
| 5,896,502 | * 4/1999 | Shieh et al. | 709/224 |
| 5,907,681 | 5/1999 | Bates et al. | 395/200.58 |
| 5,918,224 | 6/1999 | Bredenberg | 707/2 |
| 5,918,237 | 6/1999 | Montalbano | 707/513 |
| 5,930,808 | * 7/1999 | Yamanaka et al. | 707/501 |
| 5,959,623 | 9/1999 | van Hoff et al. | 345/333 |
| 5,987,504 | * 11/1999 | Toga | 709/206 |
| 6,032,182 | 2/2000 | Mullen-Shultz | 709/223 |
| 6,088,717 | * 7/2000 | Reed et al. | 709/201 |
| 6,122,657 | * 9/2000 | Hoffman, Jr. et al. | 709/201 |
| 6,226,642 | * 5/2001 | Beranek et al. | 707/10 |

FOREIGN PATENT DOCUMENTS

0451384-A1 * 4/1990 (EP) .
0903677-A2 * 3/1999 (EP) .

\* cited by examiner

Primary Examiner—Joseph H. Feild
Assistant Examiner—Cesar B. Paula
(74) Attorney, Agent, or Firm—Owen J. Gamon; Roy W. Truelson

(57) ABSTRACT

A browser selectively disables the display of viewable objects in a document. The document contains control tags that describe how associated data is to be displayed. The browser interprets the control tags and formats the associated data to display images on a display screen. The user selects an image that the user desires to be blocked. In response to this selection, the browser saves the control tag that identifies the image in a blocking list and blocks the display of the image. In this way, the user is allowed to decide which images are displayed and which are not.

32 Claims, 30 Drawing Sheets

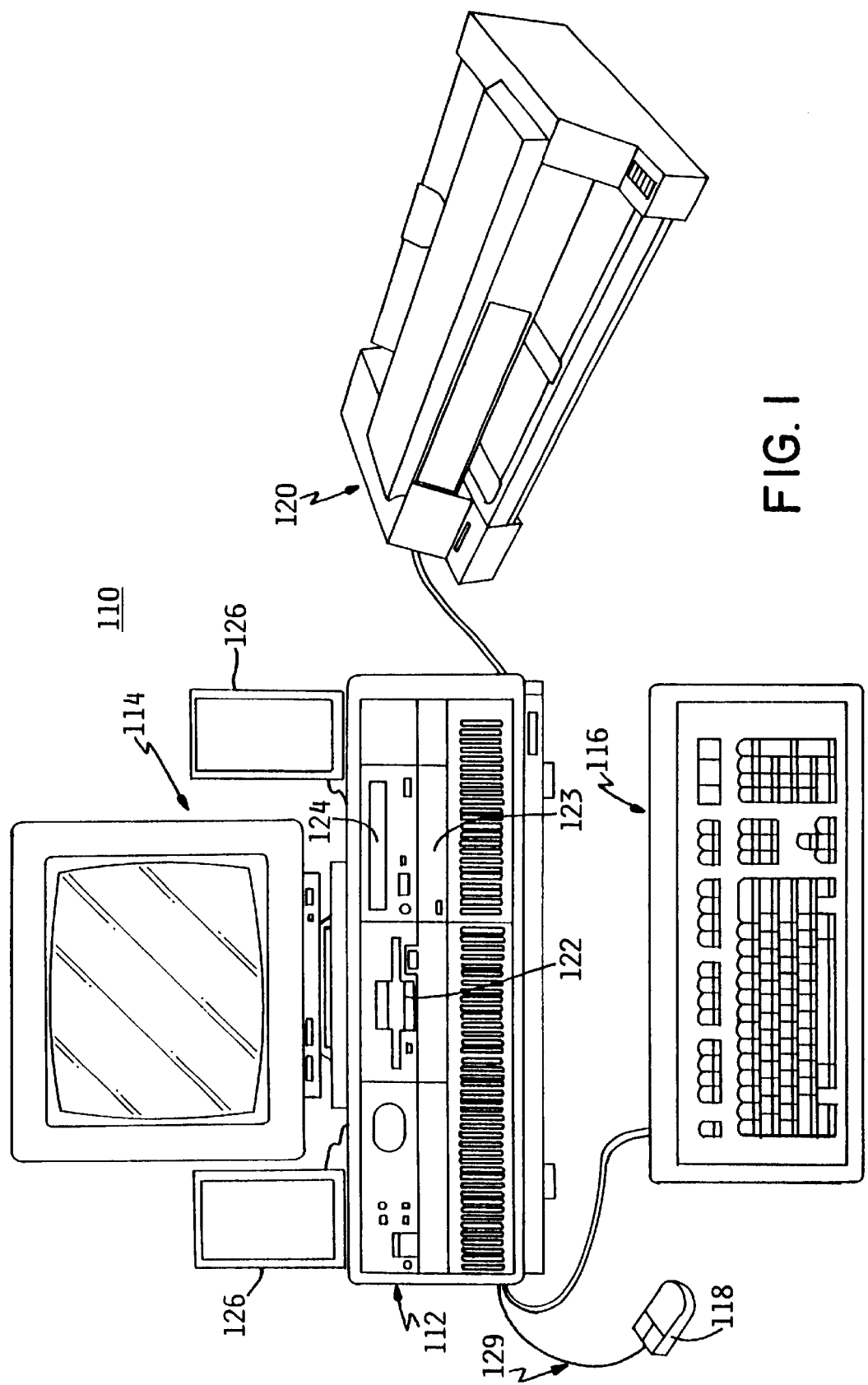

```
<HTML>
<HEAD>
<TITLE>Search Engine</TITLE>
</HEAD>
<BODY BGCOLOR="#ffffff">
...
<!--lottery image -->
<p><imgsrc="Lottery.gif" width="24" height="25"></p>    ← 815
...
<!-- searchbox -->
<FORM NAME="searchform" ACTION="/cgi-bin/WebQuery" METHOD="GET">    ← 820
<TABLE BORDER="0" CELLPADDING="2" CELLSPACING="0">
<TR>
<TD><INPUT TYPE="text" NAME="searchText" SIZE="30"><INPUT TYPE="submit"
VALUE="Enter Search Terms"></TD></TR>
<TR><TD ALIGN=CENTER>
<TABLE BORDER="0" CELLPADDING="2" CELLSPACING="2">
<TR>
```

Page

FIG. 8A

APPARATUS AND METHOD FOR THE MANUAL SELECTIVE BLOCKING OF IMAGES

FIELD OF THE INVENTION

The present invention relates in general to improved information processing systems. In particular, the present invention relates to a method and system for managing the display of images on a screen.

BACKGROUND

The development of computerized distributed information resources, such as the Internet, allows users to link to a computer network and retrieve vast amounts of electronic information previously unavailable in an electronic medium. Such electronic information increasingly is displacing more conventional means of information transmission, such as newspapers, magazines, and even television.

Electronic information transferred between computer networks (e.g., the Internet) can be presented to a user in hypertext, a metaphor for presenting information in a manner in which text, images, sounds, and actions become linked together in a complex, non-sequential web of associations that permit the user to "browse" through related topics, regardless of the presented order of the topics. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is used to describe documents, as presented by a computer, that express the nonlinear structure of ideas, as opposed to the linear format of books, film, and speech. The combination of hypertext documents connected by their links in the Internet is referred to as the World Wide Web (WWW).

Networked systems utilizing hypertext conventions typically follow a client/server architecture. A "client" is usually a computer that requests a service provided by another computer (i.e., a server). A "server" is typically a remote computer system accessible over a communications medium such as the Internet. Based upon such requests by the user at the client, the server presents information to the user as responses to the client. The client typically contains a program, called a browser, that communicates the requests to the server and formats the responses for viewing (browsing) at the client.

The browser retrieves a web page from the server and displays it to the user at the client. A "web page" (also referred to as a "page") is a data file, or document, written in a hyper-text language that may have text, graphic images, and even multimedia objects, such as sound recordings or moving video clips associated with that data file. The web page can be displayed by the client browser as a viewable object. A viewable object can contain one or more components, such as spreadsheets, text, hotlinks, pictures, sound, and video objects.

When a client workstation sends a request to a server for a web page, the server first transmits (at least partially) the main hypertext file associated with the web page, and then loads, either sequentially or simultaneously, the other files associated with the web page. The constructed web page is then displayed on a client display screen. A web page may be larger than the physical size of the display screen, and devices such as graphical user interface scroll bars can be utilized by the viewing software (i.e., the browser) to view different portions of the web page.

Many web pages are filled with numerous images. These images can be text, graphic images, video clips, or even entire windows. Some of these images are important and interesting; for example, a navigation bar. Others are more annoying; an example is advertisements. Current browsers allow the user to configure that either all images are displayed, or none at all. This "all or nothing" approach does not provide the user with an acceptable solution to managing the images in web pages.

From the foregoing, it can be seen that a need exists for a method and system for managing the display of images contained in web pages.

SUMMARY OF THE INVENTION

It is therefore one object of the present invention to provide for an improved browser method and system.

It is therefore another object of the present invention to provide an improved information processing system.

It is still another object of the present invention to provide to an improved method and system for managing the display of images.

It is still another object of the present invention to provide to a method and system for selectively disabling the display of images.

In the preferred embodiment, a browser selectively disables the display of viewable objects in a document. The document contains control tags that describe how associated data is to be displayed. The browser interprets the control tags and formats the associated data to display images on a display screen. The user selects an image that the user desires to be blocked. In response to this selection, the browser saves the control tag that identifies the image in a blocking list and blocks the display of the image. In this way, the user is allowed to decide which images are displayed and which are not.

DESCRIPTION OF THE PREFERRED EMBODIMENT

Technology Overview

Figure 2:
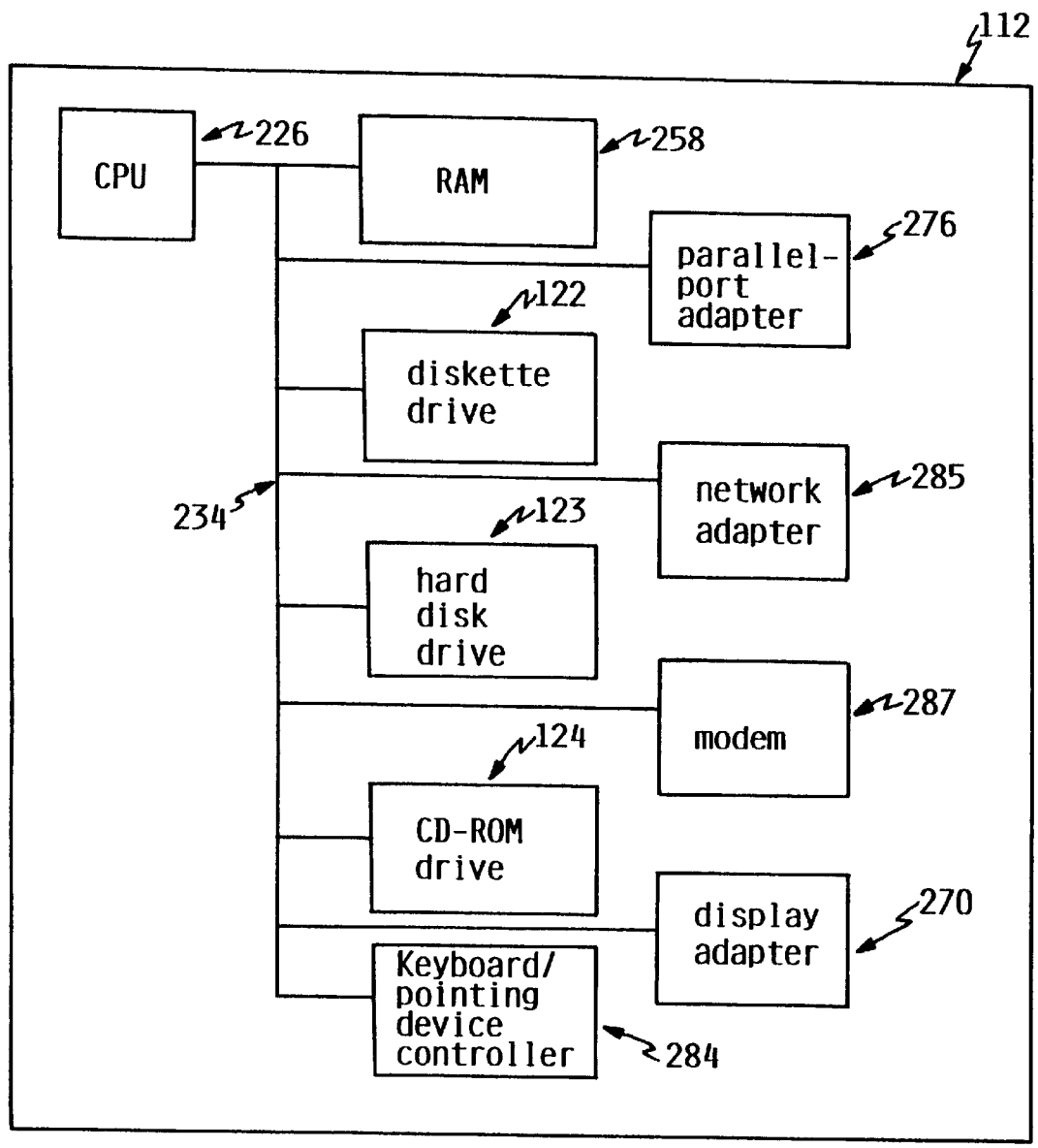
FIG. 2 is a block diagram of a representative hardware environment of the processing unit of the computer system illustrated in FIG. 1.

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Internet Protocol," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to know any working details about the other program or the service itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered electronic information to the user as server responses to the client process. The client process may be active in a first computer system, and the server process may be active in a second computer system; the processes communicate with one another over a communications medium that allows multiple clients to take advantage of the information-gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname ("www.uspto.gov") of the server. The server name is associated with a unique numeric value (i.e., a TCP/IP address). Active within the client is a first process, known as a "browser" that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure; for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays, or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, and video objects. A web page can be constructed by loading one or more separate files into an active directory or file structure that is then displayed as a viewable object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger" than the physical size of the monitor screen, and devices such as graphical user interface scroll bars can be utilized by the viewing software (i.e., the browser) to view different portions of the web page.

DETAILED DESCRIPTION

Figures 1, 9A:
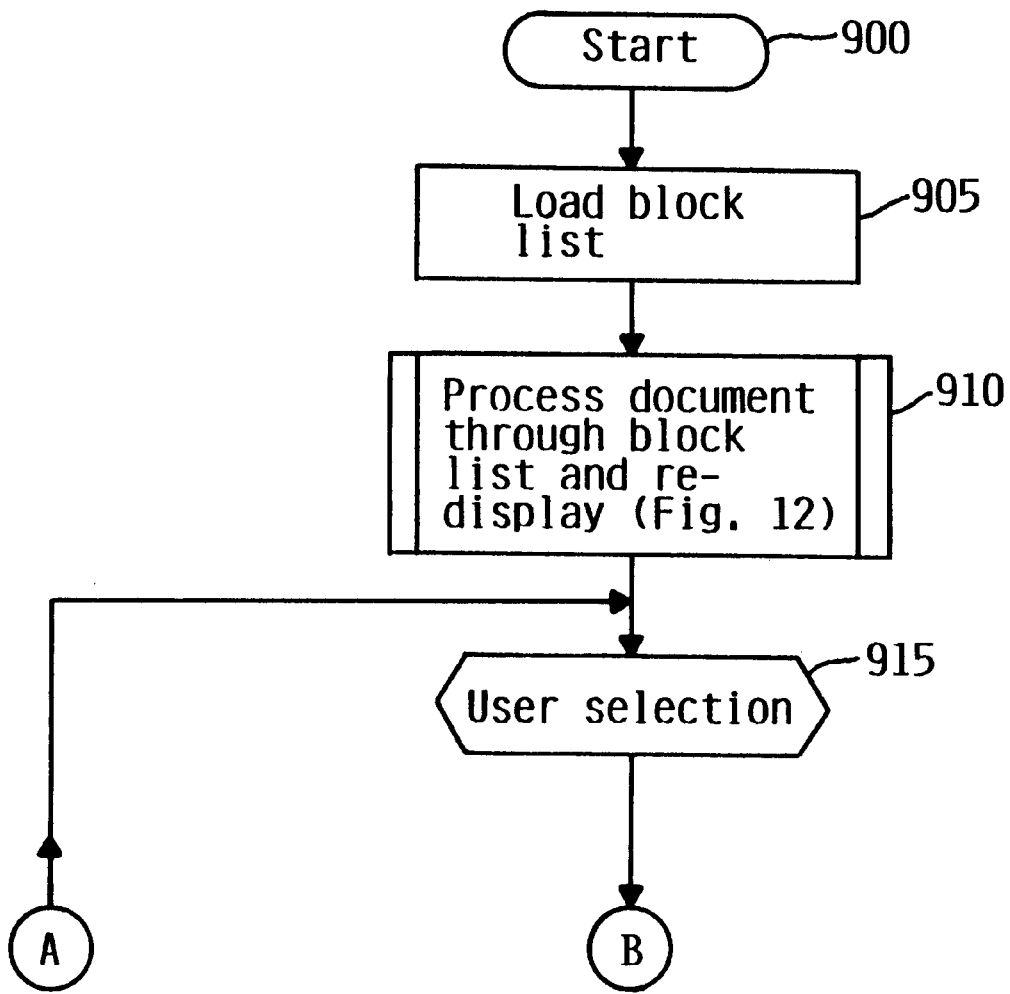
FIG. 1 is a pictorial representation of a computer system that may be utilized to implement a preferred embodiment.
FIGS. 9a, 9b, 10, 11, 12, and 13 are flowcharts that describe the operation of the preferred embodiment.
Figures 2, 9A:
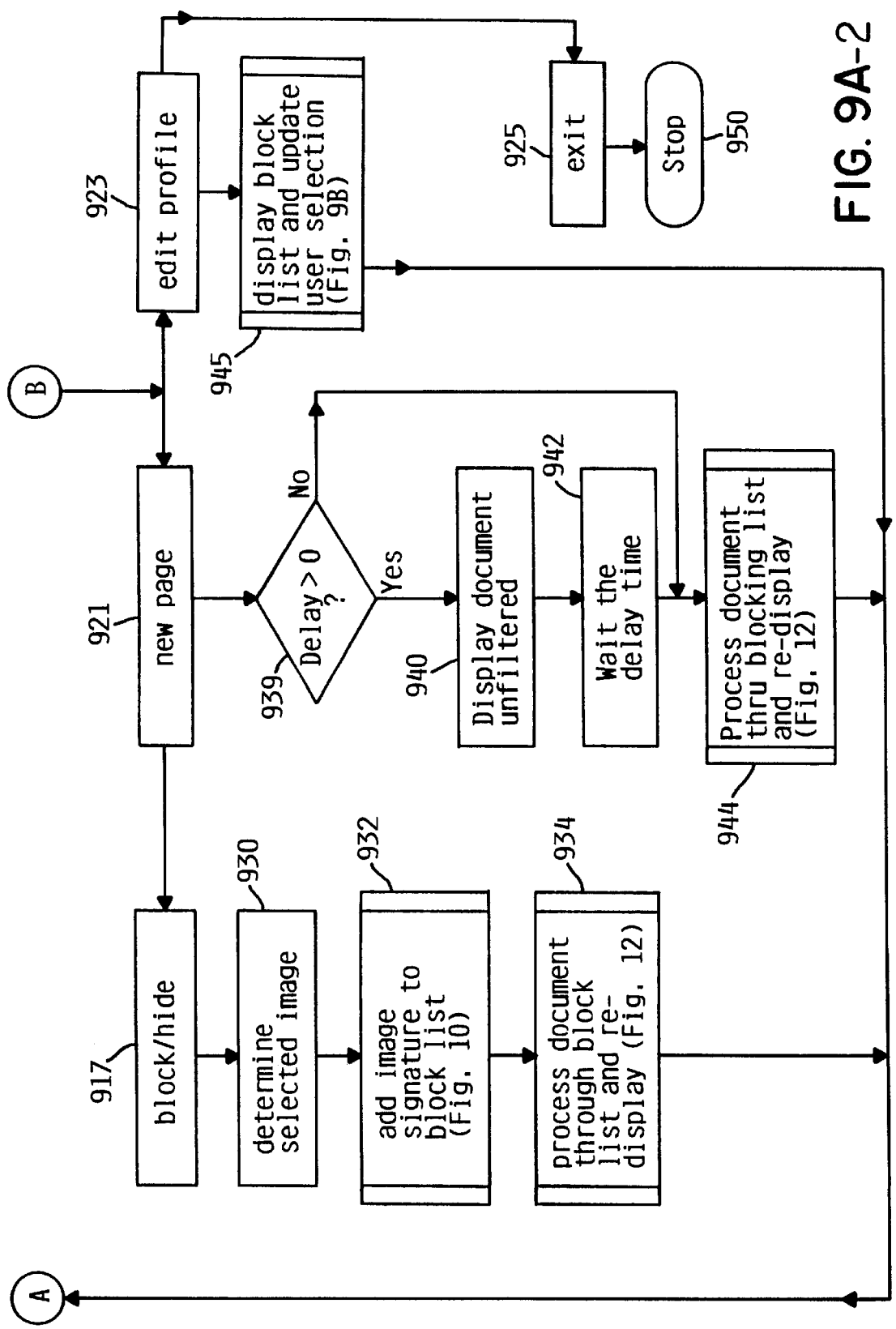

With reference now to the figures and in particular with reference to FIG. 1, there is depicted an embodiment of a computer system that may be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, or track pad could also be utilized.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a QWERTY pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video display terminal 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and a cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112.

Computer system 110 can be implemented utilizing any suitable computer such as the AS/400 computer system or IBM Aptiva computer, both products of International Business Machines Corporation, located in Armonk, N.Y. But, a preferred embodiment of the present invention can apply to any hardware configuration that allows browsing of documents, regardless of whether the computer system is a complicated, multi-user computing apparatus, a single-user workstation, or a network appliance that does not have non-volatile storage of its own. Computer system 110 is thus a configuration that includes all functional components of a computer and its associated hardware. In general, a typical computer system includes a console or processing unit such as processing unit 112, with one or more disk drives, a monitor such as video display terminal 114, and a keyboard such as keyboard 116.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270 and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

While any appropriate processor can be utilized for CPU 226, it is preferably one of the Power PC line of microprocessors available from IBM. Alternatively, CPU 226 can be implemented as one of the 80X86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual volatile memory modules that store segments of operating system and application software while power is supplied to computer system 110. The software segments are partitioned into one or more virtual memory pages that each contain a uniform number of virtual memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without having to start from the beginning.

Hard disk drive 123 and diskette drive 122 are electro-mechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or microfloppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
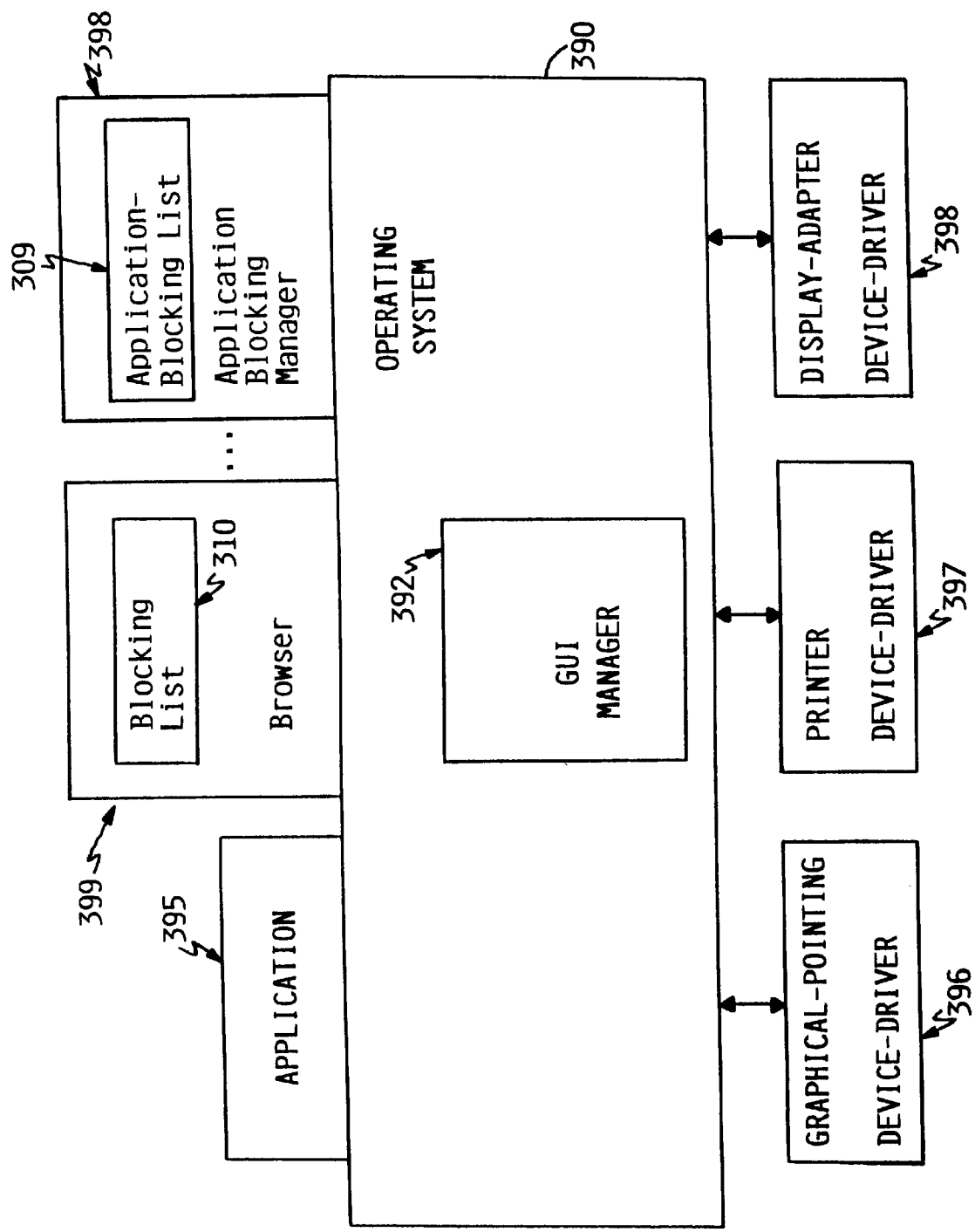
FIG. 3 is a block diagram of software stored within the memory of the computer system depicted in FIG. 1.

With reference now to FIG. 3, there is illustrated a block-diagram representation of the software configuration of computer system 110. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. A suitable operating system 390 and associated graphical-user-interface manager 392 (e.g., Microsoft Windows, AIX, or OS/2 operating systems) could be used. Other technologies also could be utilized, such as touch-screen technology or human-voice control. The operating system is the foundation upon which applications 395, such word-processing, spreadsheet, application-blocking manager, and web browser programs are built.

In accordance with the preferred embodiment, operating system 390 includes graphical-user-interface (GUI) 392 manager although they could be packaged separately. GUI 392 manages the graphical-user-interface with which a user of computer system 110 interacts.

Operating system 390 communicates with applications 395, browser 399, and application-blocking manager 398 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer-control codes and data to printer device-driver 397, which in turn translates the control codes and data into bus signals used to control printer 120.

CPU 226 is suitably programmed to carry out the preferred and alternative embodiments by browser 399 and application-blocking manager 398, as described in more detail in the flowcharts of FIGS. 9–13 and 17–21. In the alternative, the functions of FIGS. 9–13 and 17–21 could be implemented by control circuitry through the use of logic gates, programmable-logic devices, or other hardware components in lieu of a processor-based system.

Browser 399 includes blocking list 310, which is further described under the description for FIG. 8 below. In an alternative embodiment, blocking list 310 could be packaged separately from browser 399. Although browser 399 is drawn as being separate from operating system 390, they could be packaged together.

Application-blocking manager 398 includes application-blocking list 309, which is further described under the description for FIG. 16, below. In an alternative embodiment, application-blocking list 309 could be packaged separately from application-blocking manger 398. Although application-blocking manager 398 is drawn as being separate from operating system 390, they could be packaged together. Although application-blocking manager 398 is drawn as being separate from browser 399, they could be packaged together. The functions of application-blocking manager 398 could be performed by a browser, and the use of the word "browser" herein encompasses any application capable of selectively. blocking images on a display screen.

Figure 4:
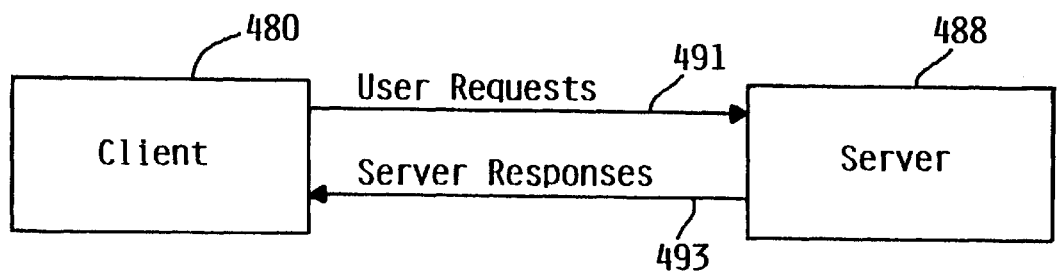
FIG. 4 is a block diagram illustrative of a client/server architecture in accordance with a preferred embodiment.

FIG. 4 illustrates a block diagram illustrative of a client/server architecture, in accordance with a preferred embodiment of the present invention. User requests 491 are sent by client process 480 to server 488. Server 488 can be a remote computer system accessible over a computerized, distributed-information resource such as the Internet or other communications network. Server 488 performs scanning and searching of information sources and, based upon these user requests, presents the filtered electronic information as server responses 493 to the client process. The client process may be active in a first computer system (such as computer system 10), and the server process may be active in a second computer system, communicating with one another over a communications medium, thus providing distributed functionality and allowing multiple clients to take advantage of the information-gathering capabilities of the server.

Figure 5:
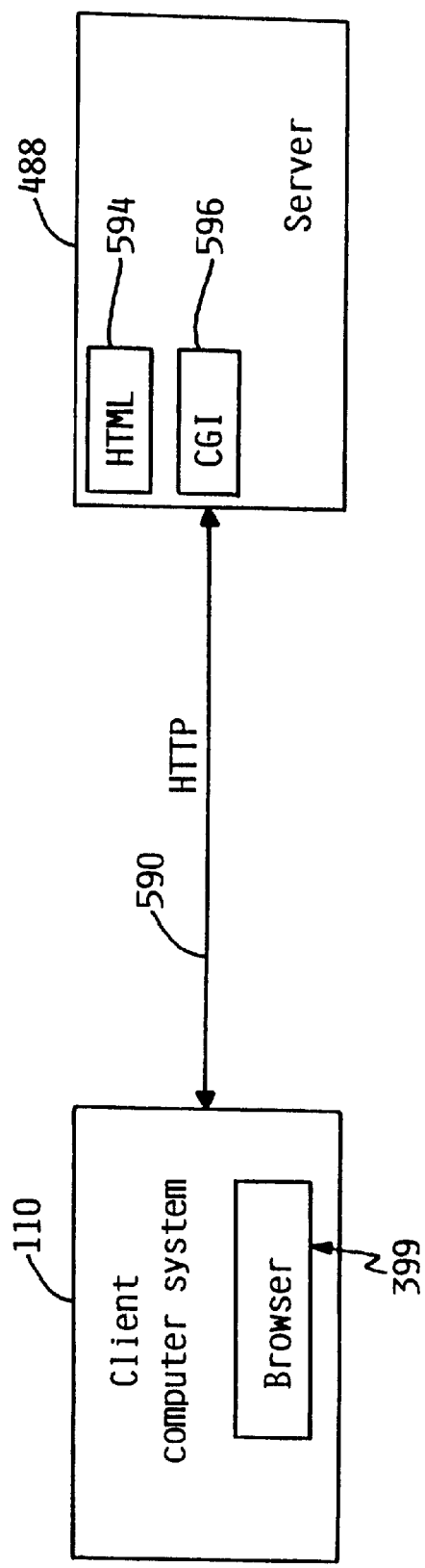
FIG. 5 is a detailed block diagram of a client/server architecture in accordance with a preferred embodiment.

FIG. 5 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), they could be implemented in a variety of hardware devices, either programmed or dedicated.

Computer system 110, functioning as a client, and server 488 communicate by utilizing the functionality provided by HTTP. Active within client 110 is a first client process, browser 399, which establishes connections with server 488 and presents information to the user.

Server 488 executes the corresponding server software, which presents information to the client in the form of HTIP responses 590. The HTTP responses 590 correspond with the web pages represented using HTML or other data generated by server 488. Server 488 provides HTML 594. Server 488 also provides Common Gateway Interface (CGI) 596, which allows client 110 to direct server 488 to commence execution of a specified program contained within server 488. This may include a search engine that scans received information in the server for presentation to the user controlling the client. Using this interface and HTTP responses 590, server 488 may notify client 110 of the results of that execution upon completion. Although the protocols of HTML, CGI, and HTTP are shown, any suitable protocols could be used.

Figure 6:
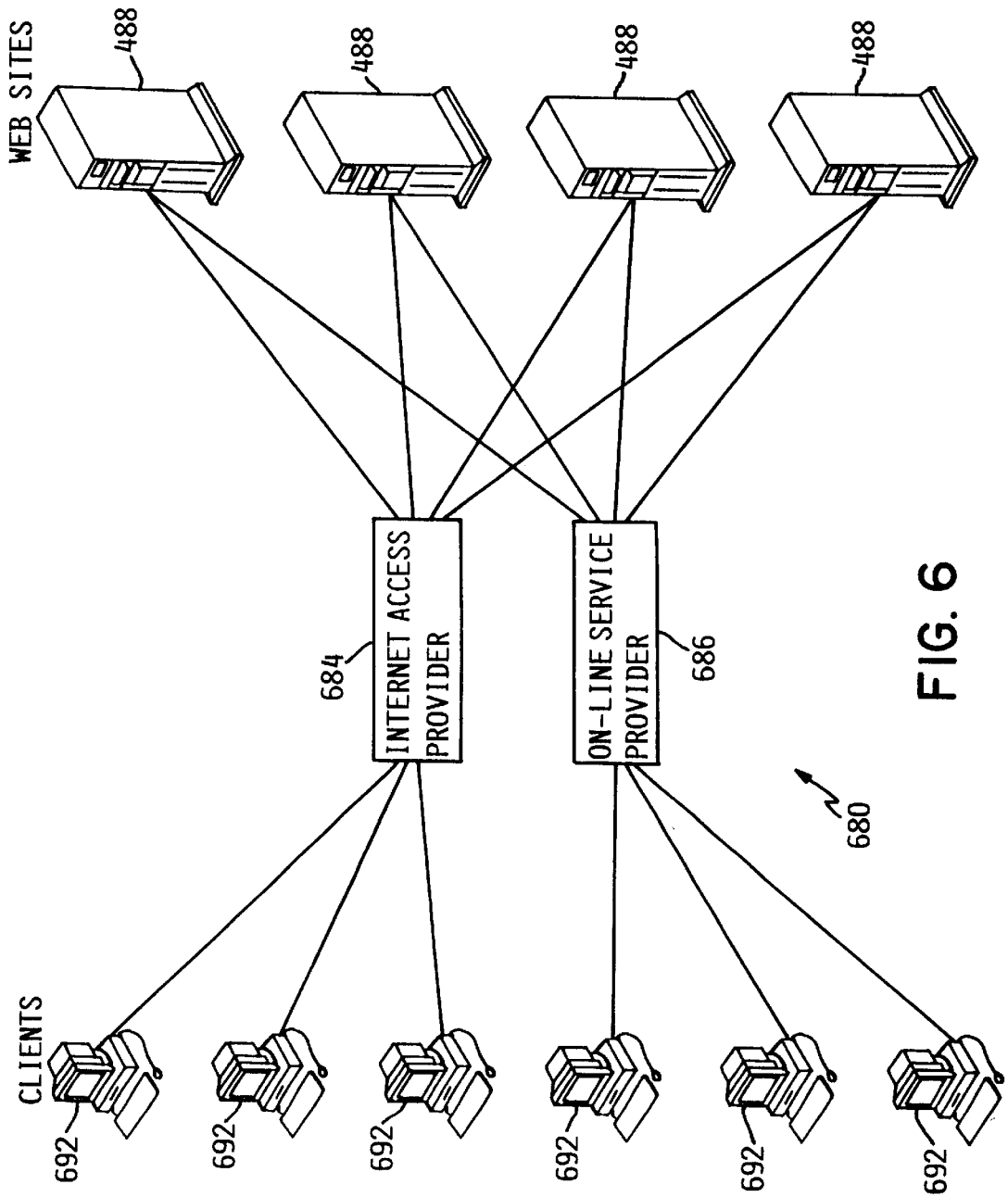
FIG. 6 is a diagram illustrative of a computer network that can be implemented in accordance with a preferred embodiment.

FIG. 6 is a diagram illustrative of a computer network 680, which can be implemented in accordance with a preferred embodiment of the present invention. Computer network 680 is representative of the Internet, which can be described as a known computer network based on the client-server model discussed herein. Conceptually, the Internet includes a large network of servers 488 that are accessible by clients 692, typically computers such as computer system 110, through some private Internet access provider 684 (e.g., Internet America) or an on-line service provider 686 (e.g., America On-Line, Prodigy, and Compuserve). Each of clients 692 may run browser 399 to access servers 488 via the access providers. Each server 488 operates a so-called "web site" that supports files in the form of documents or pages. A network path to servers 488 is identified by a Universal Resource Locator (URL) having a known syntax for defining a network connection.

Figure 7A:
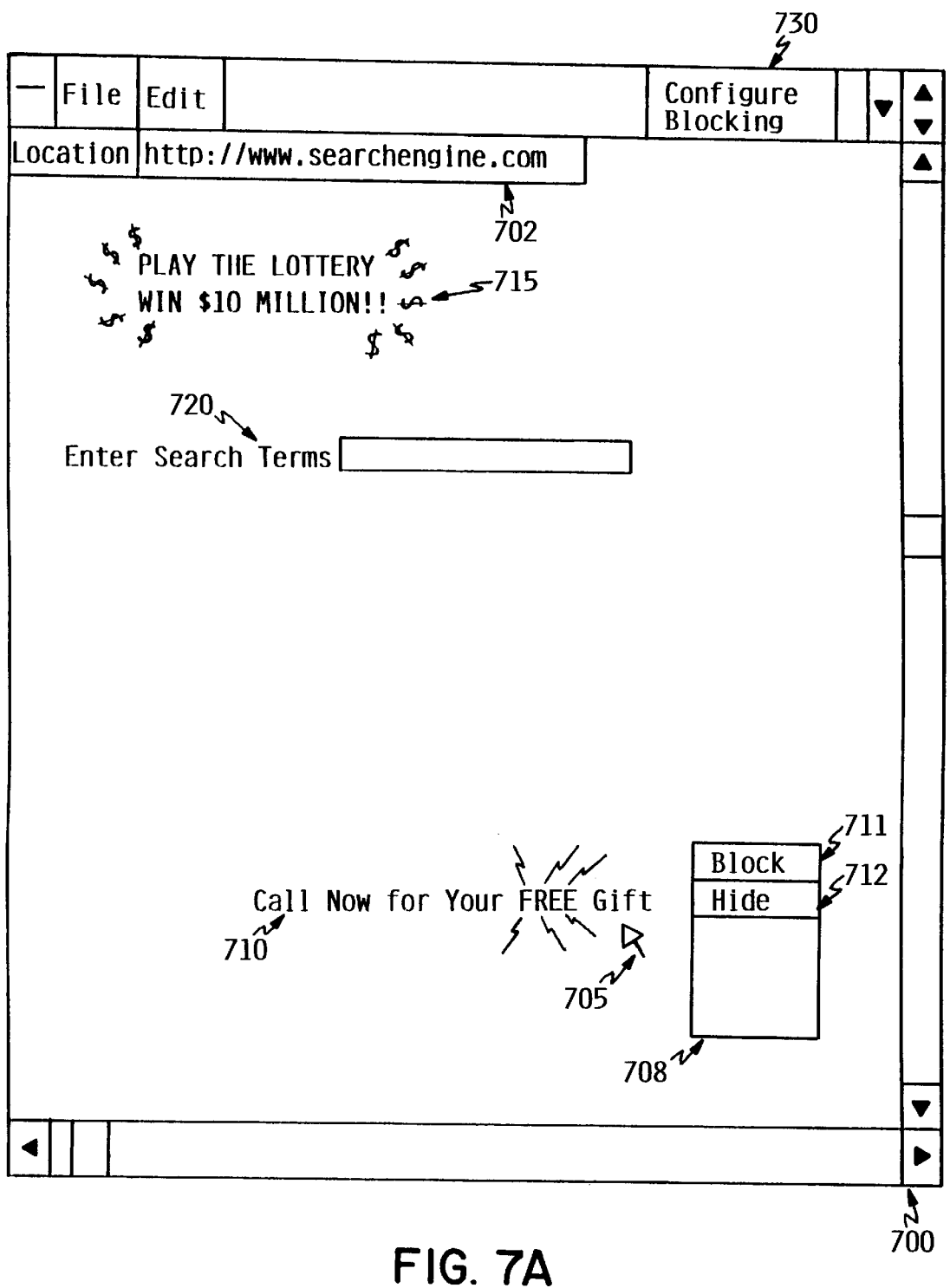
FIGS. 7a and 7b are pictorial representations of the interfaces that are used to control the operation of a preferred embodiment.

FIG. 7a illustrates a pictorial representation of the interfaces that are used to control the operations of the preferred embodiment. FIG. 7a contains browser window 700 that is displayed on display screen 114. The user has previously entered URL 702, which is the address from which browser 399 downloaded the example page from a server, which contains images 710 and 715 and search terms input field 720. The source for the example page, which browser 399 interpreted in order to create the contents of browser window 700 is partially shown in FIG. 8, below.

Referring again to FIG. 7a, when the user selects image 710 via pointer 705, browser 399 displays pop-up dialog 708, which contains options block 711 and hide 712. In response to the user selecting block 711 or hide 712, browser 399 will block or hide image 710, as further described below under the description for FIGS. 7c, 7d, and 9.

Menu-option configure-blocking 730 allows the user to control the configuration of the blocking function. When the user selects menu option 730, browser 399 displays a dialog, as shown in the example of FIG. 7b described below.

Figure 7B:
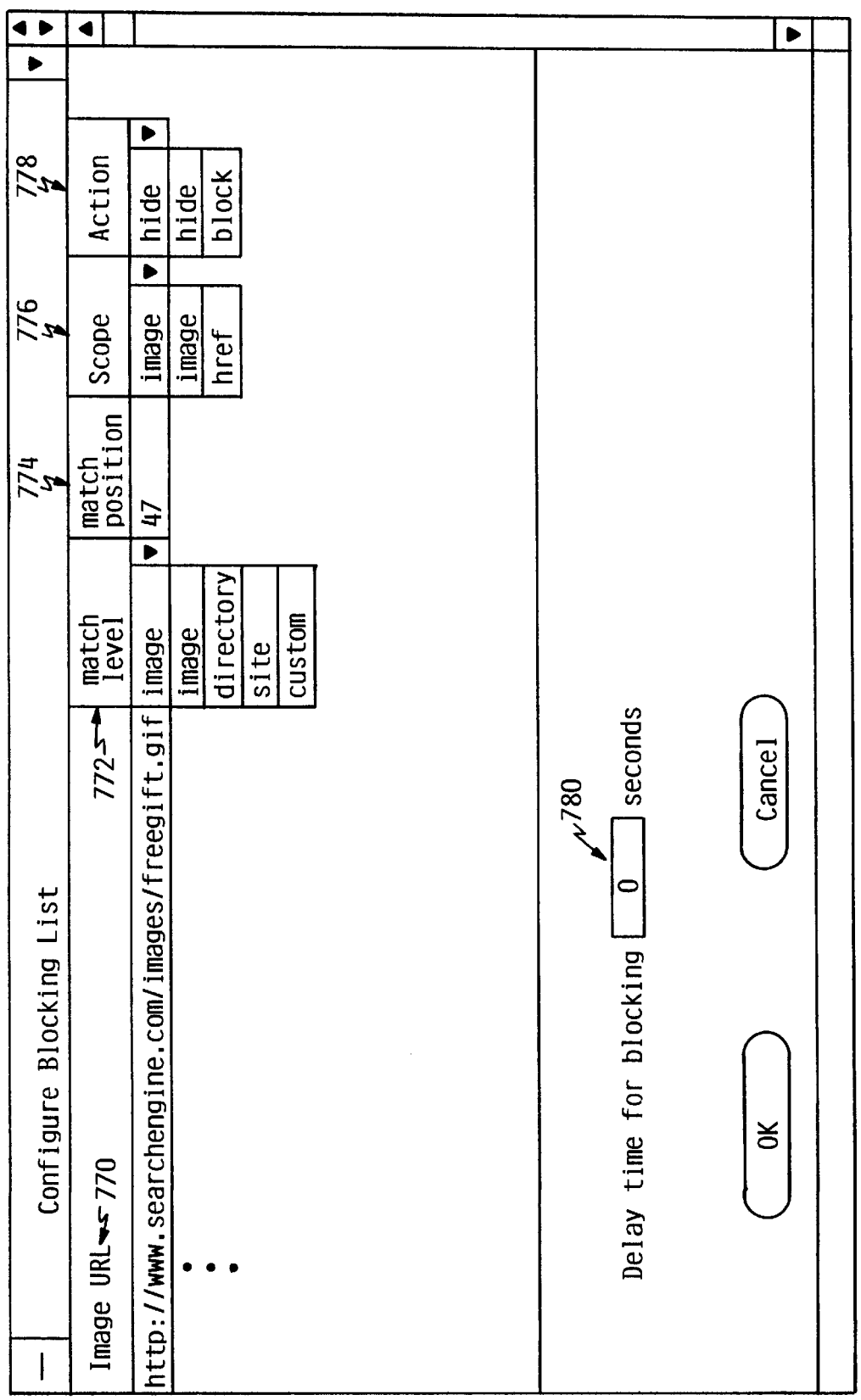

FIG. 7b illustrates a pictorial representation of the interfaces presented by browser 399 when the user selects configure blocking option 730, as described above under the description for FIG. 7a. Referring again to FIG. 7b, browser 399 has displayed the fields in blocking list 310 that are available for the user to modify. These fields are image-URL 770, match level 772, match position 774, scope 776, and action 778. In addition, browser 399 has displayed delay field 780, which applies globally to all records in blocking list 310.

Image-URL 770 contains the complete URL address of the image data that is to be blocked. This URL is embedded within page 850, as shown in FIG. 8. (URLs are allowed to be incomplete in HTML documents, but browser 399 will determine and use the complete URL.) Referring again to FIG. 7b, notice that the contents of image-URL 770 will be blocked regardless from which web page it is embedded. Thus, if multiple web pages embed the same URL, browser 399 will block the image regardless of which web page embeds it. In this example, image-URL field 770 contains "http://www.searchengine.com/images/freegift.gif".

Match level field 772 directs browser 399 in determining how much of the URL in image-URL field 770 to use. When match level field 772 contains the contents "image", then browser 399 will use the entire URL from image-URL field 770. In this example, when match level field 772 contains "image", browser 399 will only block the image "freegift-.gif" that is in directory "images" at site "www.searchengine.com". If match level field 772 were to contain "directory", then browser 399 would block all image files in directory "images" at site "www.searchengine.com". If match-level field 772 were to contain "site", then browser 399 would block all images in all directories at site "www.searchengine.com". If match-level field 772 were to contain "custom", then the user also must enter a value for match-to-position field 774, which browser 399 will use when comparing the contents of image-URL field 770 to potential blocked files.

Match-to-position field 774 contains the number of significant characters in image-URL field 770 that are to be compared to a potential URL when determining whether the potential URL is to be blocked. Browser 399 calculates the value in match-position field 774 based on the value of match-level field 772 when match-level field 772 contains "image", "directory", or "site". When match-level field 772 contains "custom", the user is responsible for entering a value in match-position field 774. In this example, match position field 774 contains "47". Because the user has selected "image" for the contents of match-level field 772, only the specific image file in image-URL field 770 is to be blocked. Thus, the entire contents of image-URL field 770 must be compared, so match-position field 774 is "47", which is the length of the value in image-URL field 770.

Scope field 776 can contain "image" or "href". When scope field 776 has a value of "href", both the image tag within and the surrounding HTML href tag will be blocked. When scope field 776 has a value of "image", only the image tag itself will be blocked. The "href" tag provides the ability to hyperlink to another source or display an image in response to the user selecting a button or hotspot on the screen. Thus, "image" in scope field 776 directs browser 399 to block only those images that are displayed as part of the display of their embedding page, while "href" in scope field 776 directs browser to, in addition, block those images that would have been displayed only by selecting them via a hotspot on the display screen.

Action field 778 can contain "hide" or "block". When action field 778 contains "hide" then browser 399 will hide the image, as further described under the description for FIG. 7d below. When action field 778 contains "block", then browser 399 will block the image with an icon, as further described below under the description for FIG. 7c.

Referring again to FIG. 7b, delay field 780 contains the number of seconds that the user wishes the selected image to be displayed on the screen before it is blocked or hidden. As shown in FIG. 7b, the default value for delay field 780 is "0", meaning that there is no delay, so the selected image will not be displayed prior to blocking. The processing for delay field 780 is further described below under the description for FIG. 9a.

Figure 7C:
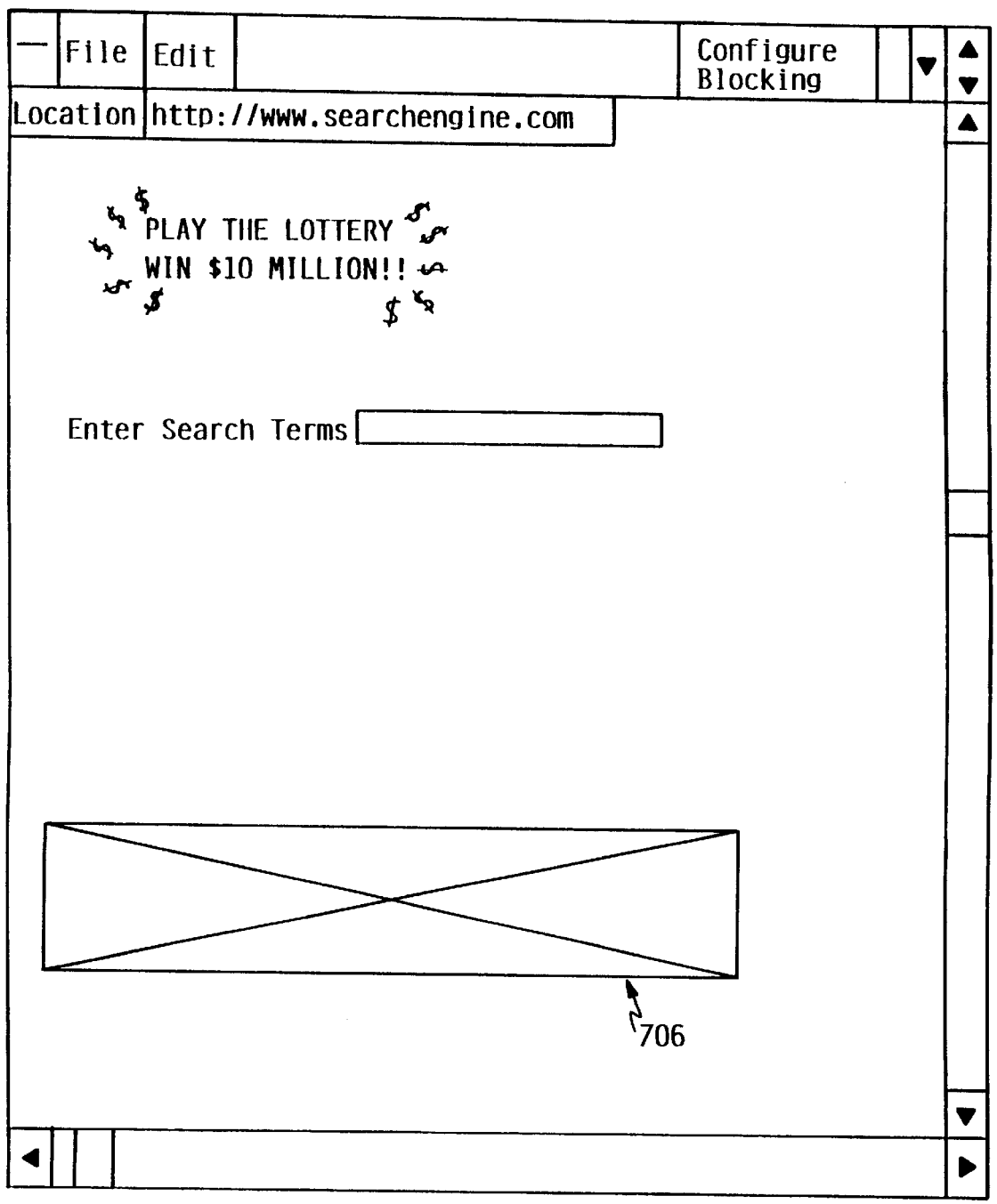
FIG. 7c is a pictorial representation of a display screen after blocking an image, according to a preferred embodiment.

FIG. 7c illustrates a pictorial representation of a display screen after blocking an image, according to the preferred embodiment. The user previously selected image 710 with pointer 705 and selected block option 711, as shown in FIG. 7a. Referring again to FIG. 7c, in 25 response to the user's request, browser 399 displayed icon 706, indicating the location at which the image would have been placed had it not been blocked as further described below under the description for FIGS. 9a, 10, and 12.

Figure 7D:
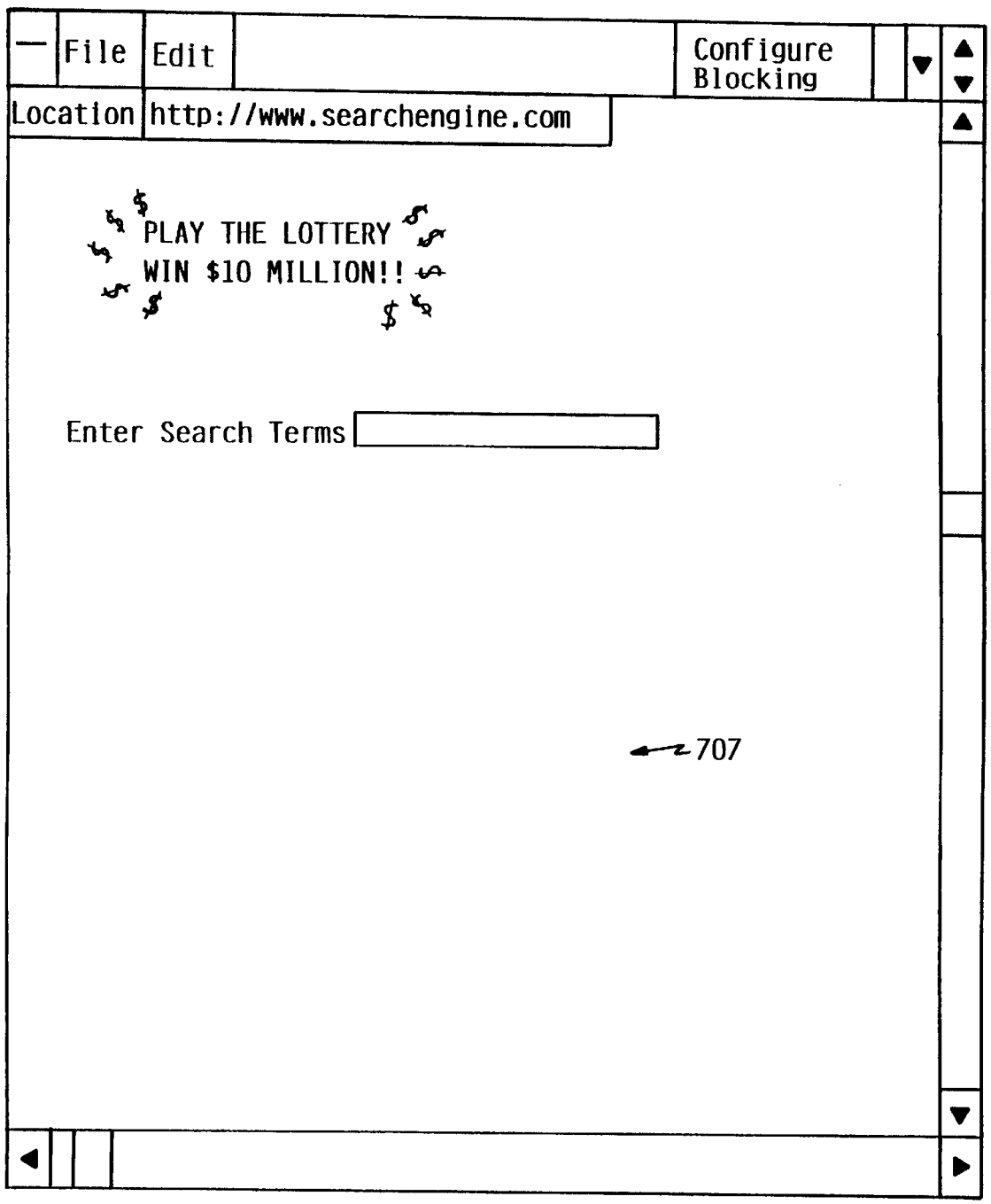
FIG. 7d is a pictorial representation of a display screen after hiding an image, according to a preferred embodiment.

FIG. 7d illustrates a pictorial representation of a display screen after hiding an image, according to the preferred embodiment. The user previously selected image 710 with pointer 705 and selected hide option 712, as shown in FIG. 7a above. Referring again to FIG. 7d, in response to the user's request, browser 399 has not displayed image 710, so that area 707 in FIG. 7d where image 710 had been displayed in FIG. 7a is blank as further described below under the description for FIGS. 9a, 10, and 12.

Figure 8B:
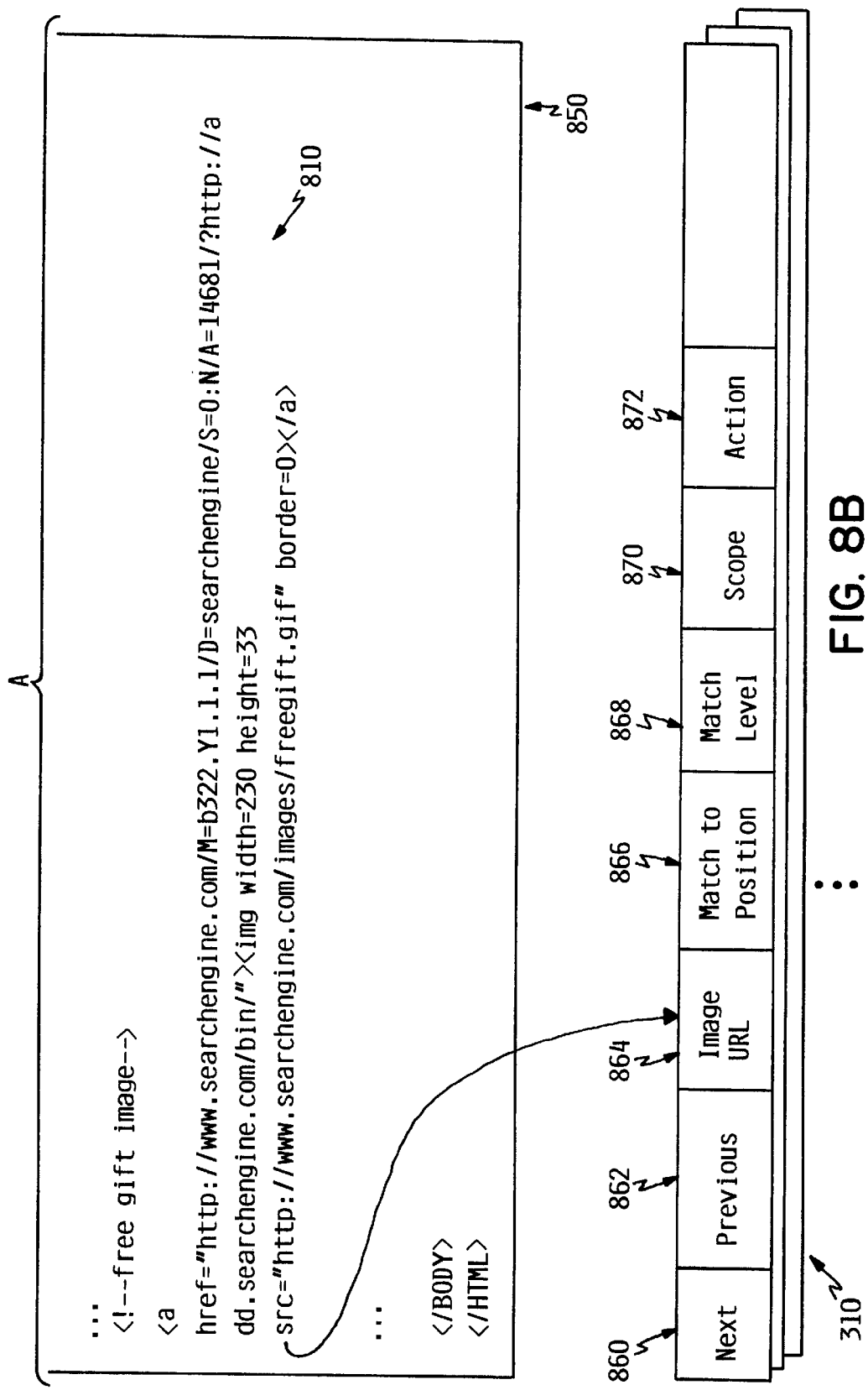
FIG. 8 is a block diagram of the data structures of the preferred embodiment.

FIG. 8 illustrates a block diagram of the data structures of the preferred embodiment. Page 850 represents a page (or document) in HTML format stored on a server and downloaded to the client in response to request from browser 399. Blocking list 310 is a data structure maintained by browser 399. Downloaded document 850 and blocking list 310 may be stored in local or remote storage associated with computer system 112; for example, RAM 258, diskette drive 122, or hard disk drive 123.

Page 850 contains example HTML control tags that browser 399 interprets to display the sample viewable object on display screen 114 shown in FIG. 7a. Referring again to FIG. 8, tag 815, when interpreted by browser 399, causes browser 399 to download the document "Lottery.gif" from a server and display image 715. Tags 820, when interpreted by browser 399, causes the display of search terms input field 720. Tags 810, when interpreted by browser 399, causes browser 399 to create a complete URL from the incomplete tag and download document "freegift.gif" from the base address "http:/www.searchengine.com" and display free-gift image 710. Browser 399 will complete image references that are incomplete or partial with reference to the document base address.

Blocking list 310 contains blocking records each of which contains next field 860, previous field 862, image-URL field 864, match-to-position field 866, match level 868, scope field 870, and action field 872. Image-URL field 864 stores the contents of image-URL 770. Match-to-position field 866 stores the contents of match position 774. Match-level field 868 stores the contents of match level 772. Scope field 870 stores the contents of scope 776. Action field 872 stores the contents of action 778. Browser 399 uses next field 860 to find the next record in blocking list 310. Browser 399 uses previous field 862 to find the previous record in blocking list 310.

When the user selects an image in the browser window, such as that shown in FIG. 7a, and then selects either block option 711 or hide option 712, browser 399 finds the image tag associated with the selected image and copies it to image-URL field 864 in the record associated with this image. In the example of FIGS. 7a and 8, browser 399 would copy "http://www.searchengine.com/images/freegift.gif" to image-URL field 864.

FIGS. 9a, 9b, and 10–13 illustrate flowcharts that describe the operation of the preferred embodiment. Referring to FIG. 9a, there is illustrated the main logic of browser 399 that responds to requests from the user. At block 900, browser 399 starts. Control then continues to block 905 where browser 399 loads blocking list 310. Control then continues to block 910 where browser 399 processes the displayed document through the records in blocking list 310 and re-displays the viewable object associated with the document, as described below under the description for FIG. 12. An example of the displayed document is page 850, as shown in FIG. 8. Referring again to FIG. 9a, control then continues to block 915, where browser 399 gets the next operation requested by the user and determines which operation the user requested. The user can request a block or hide operation 917, a new page operation 921, an edit-profile operation 923, or an exit operation 925.

A block or hide operation 917 is requested by the user by selecting an image on the browser screen and choosing block option 711 or hide option 712, respectively, as described above under the description for FIG. 7a. Referring again to FIG. 9a, when the user selects this operation, control continues to block 930 where browser 399 determines which image on the display screen was selected by the user. Control then continues to block 932 where browser 399 adds the image signature for the selected image to blocking list 310, as further described below under the description for FIG. 10. Referring again to FIG. 9a, control then continues to block 934 where browser 399 processes the document through blocking list 310 and re-displays it, as further described below under the description for FIG. 12. Referring again to FIG. 9a, control then returns to block 915, as described above.

When browser 399 determines at block 915 that the user has requested that a new page be downloaded and displayed, then control continues to block 939. The user can request such an operation, for example, by entering a URL into location field 702 as described above under the description for the FIG. 7a. The user can also request such an operation by selecting a hot spot in a displayed page or by selecting a bookmark entry.

Referring again to FIG. 9a, at block 939, browser 399 determines whether the user entered a delay time (shown at delay 780 in FIG. 7b) greater than zero. If the determination at block 939 is true, then control continues to block 940 where browser 399 interprets the control tags in the document and displays the document's viewable object on display screen 114 without processing the document through blocking list 310. Thus, the processing of block 940 will display the images that the user had previously requested to be blocked. Control then continues to block 942, where browser 399 waits for the time specified by the user at delay 980. If the user requests an operation while browser 399 is waiting at block 942, browser 399 will jump back to block 915 to process the request.

Control then continues to block 944 where browser 399 processes the retrieved document through blocking list 310 and re-displays it, as described below under the description for FIG. 12. Referring again to FIG. 9a, control then returns to block 915, as described above.

If the determination at block 939 is false, then control continues directly to block 944, as previously described above.

When browser 399 determines at block 915 that the user has requested an edit-profile operation, then control continues to block 945. The user can request such an operation by selecting configure-blocking option 730, as described above under the description for FIG. 7a. Referring again to FIG. 9a, at block 945, browser 399 displays the contents of blocking list 310 to the user and updates the user-entered fields into blocking list 310, as further described below under the description for FIG. 9b. The user can also remove entries from blocking list 310 in which case the image associated with the image-URL 770 that is removed will no longer be blocked or hidden. Such an example user interface is described above under the description for FIG. 7b. Referring again to FIG. 9a, control then returns to block 915, as described above.

When browser 399 determines at block 915 that the user has requested to exit, then control stops at block 950.

Figure 9B:
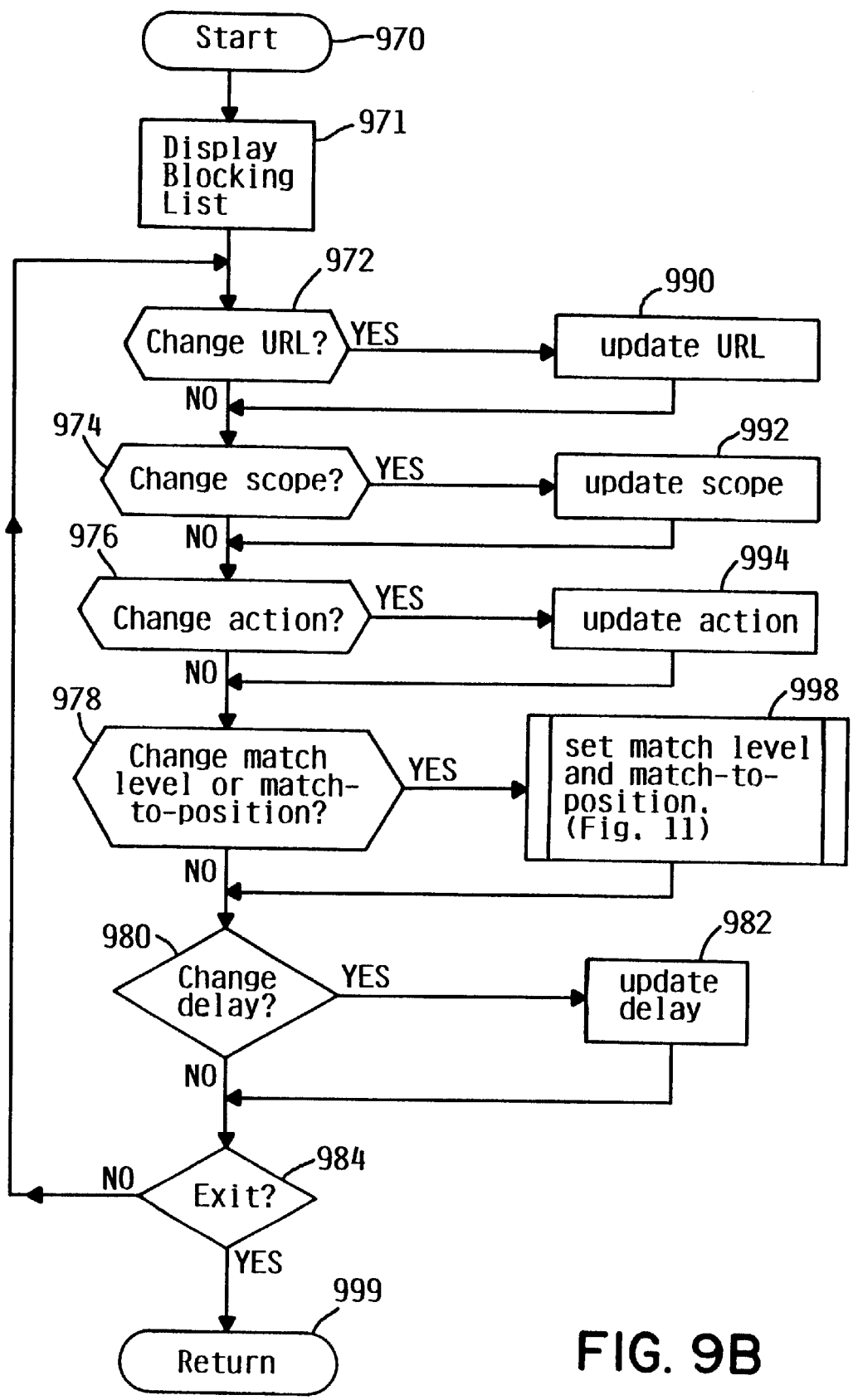

Referring to FIG. 9b, there is illustrated sample logic for displaying the contents of blocking list 310 and updating the user-entered fields. At block 970, control starts. Control then continues to block 971 where browser 399 displays the contents of blocking list 310 for the user to view and modify. Control then continues to block 972 where browser 399 determines whether the user changed image-URL field 770. If the determination at block 972 is true, then browser 399 updates image-URL field 864 in blocking list 310. Control then continues to block 974, as described below.

If the determination at block 972 is false, then control continues to block 974 where browser 399 determines whether the user changed scope field 776. If the determination at block 974 is true, then browser 399 updates scope field 870 in blocking list 310. Control then continues to block 976, as described below.

If the determination at block 974 is false, then control continues to block 976 where browser 399 determines whether the user changed action field 778. If the determination at block 976 is true, then browser 399 updates action field 872 in blocking list 310. Control then continues to block 978, as described below.

If the determination at block 976 is false, then control continues to block 978 where browser 399 determines whether the user changed match-level field 772 or match-position field 774. If the determination at block 978 is true, then browser 399 calls the logic of FIG. 11 and passes the contents of match-level field 772 or if match-level is "custom", the contents of match-to-position field 774, as shown at block 998. Control then continues to block 980, as described below.

If the determination at block 978 is false, then control continues directly to block 980 where browser 399 determines whether the user changed delay field 780. If the determination at block 980 is true, then control continues to block 982 where browser 399 saves the delay requested by the user. Control then continues to block 984, as described below.

If the determination at block 980 is false, then control continues directly to block 984 where browser determines whether the user is done requesting updates. If the determination at block 984 is false, then control returns to block 972, as described above. If the determination at block 984 is true, the control continues to block 999 where the function returns.

Figure 10:
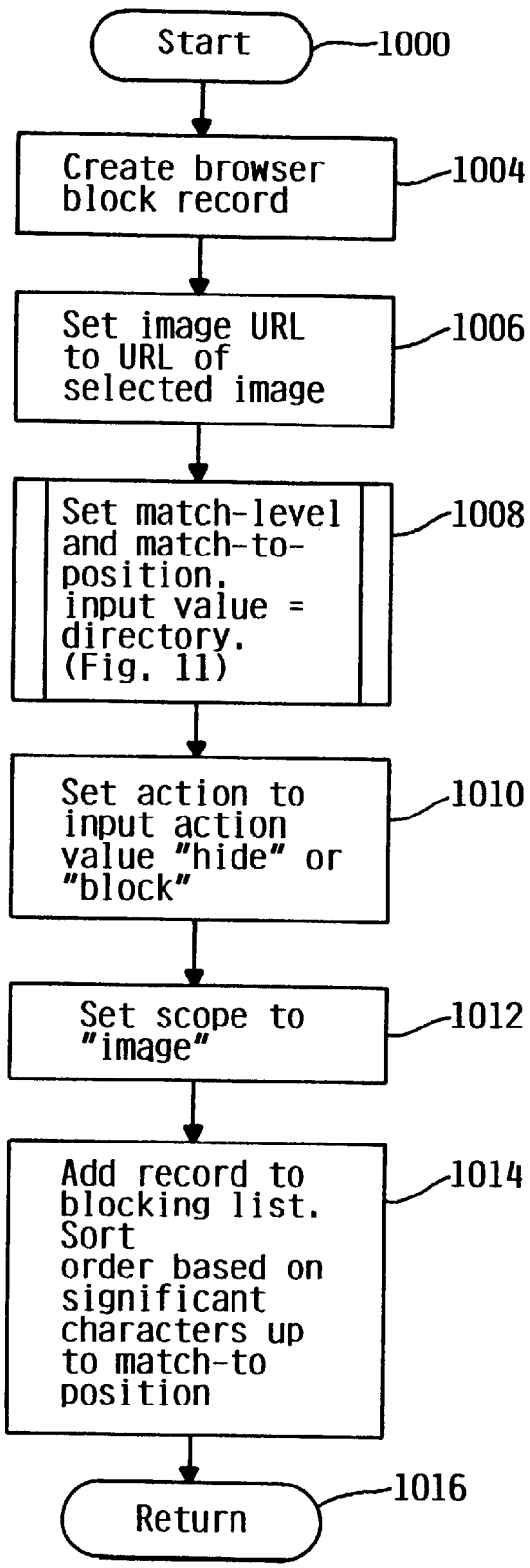

Referring to FIG. 10, there is illustrated sample logic that adds an image signature to blocking list 310. Control starts at block 1000. Control then continues to block 1004 where browser 399 creates an entry in blocking list 310. Control then continues to block 1006 where browser 399 sets image-URL field 864 in the entry just created at block 1004 to be the full address of the image that the user selected, as previously described under the description for FIG. 7a. Referring again to FIG. 10, control then continues to block 1008 where browser 399 sets match-level field 868, with a default value of "directory", and match-to-position field 866 in the entry just created at block 1004, as further described below under the description for FIG. 11.

Control then continues to block 1010 where browser 399 sets action field 872 in the entry previously created at block 1004 to be either hide or block, depending on whether the user selected block action 711 or hide action 712, as described above under the description for FIG. 7a. Referring again to FIG. 10, control then continues to block 1012, where browser 399 sets scope field 870 in the blocking record created at block 1004 to the default value of "image". The user may change this default value by accessing the user interface shown in FIG. 7b. Referring again to FIG. 10, control then continues to block 1014 where browser 399 adds the newly created blocking record to blocking list 310. Browser 399 also sorts all records in blocking list 310 based on each record's image-URL field 770 based on significant characters up to each record's match-to-position field 774. This sorting process allows browser 399 to process a general match first before any specific matches that might occur. Control then continues to block 1016 where the function returns.

Figure 11:
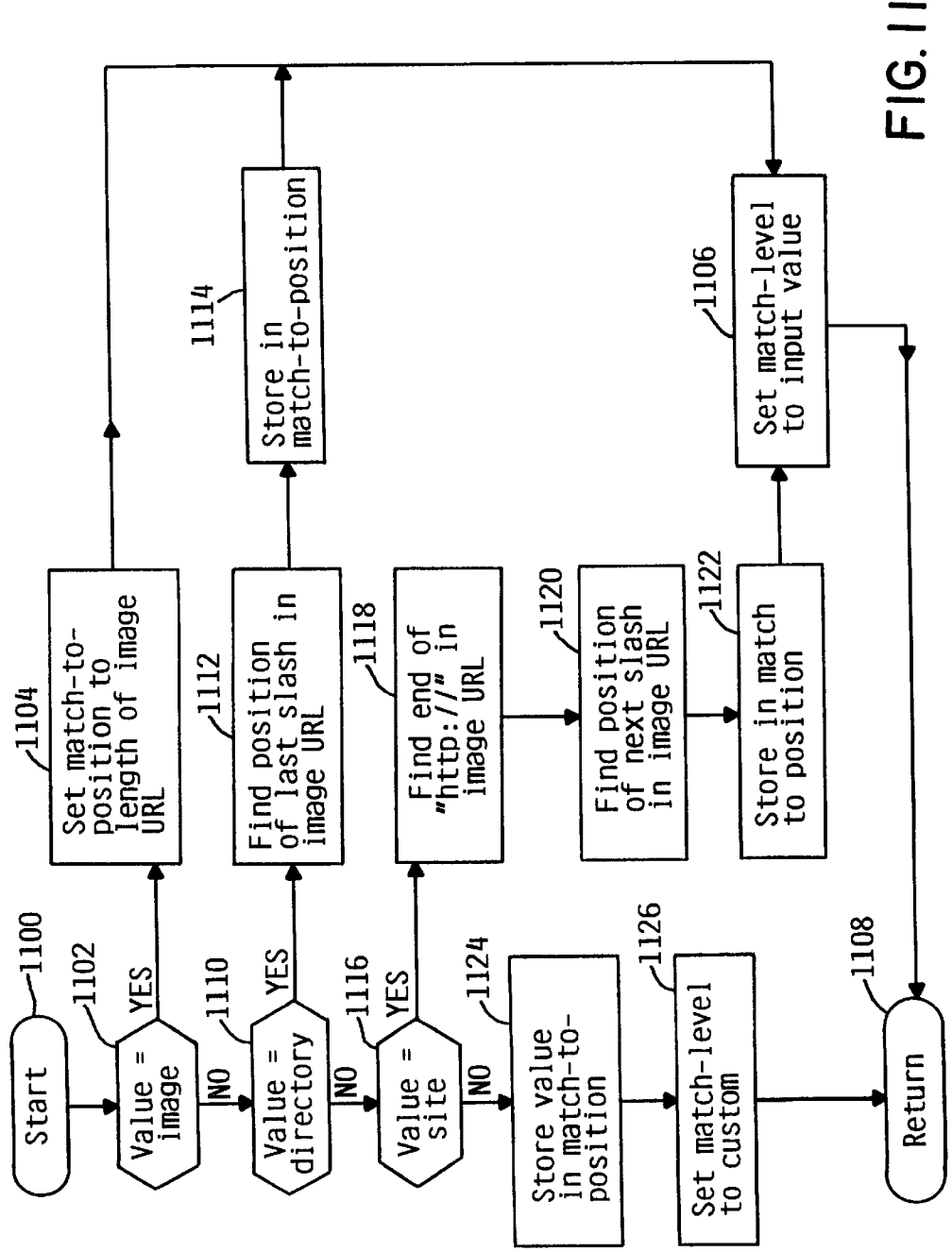

Referring to FIG. 11, there is illustrated sample logic that sets match-level field 868 and match-to-position field 866. Control starts at block 1100. Control then continues to block 1102 where browser 399 determines whether the input value equals "image". If the determination at block 1102 is true, then control continues to block 1104, where browser 399 sets match-to-position 866 to the length of image-URL 864. Control then continues to block 1106 where browser 399 sets match-level 868 to be the input value. Control then continues to block 1108 where the function returns.

If the determination at block 1102 is false, then control continues to block 1110 where browser 399 determines whether the input value equals "directory". If the determination at block 1110 is true, then control continues to block 1112 where browser 399 finds the position of the last "/" in image-URL 864. Control then continues to block 1114 where browser 399 stores the position of the last "/" in match-to-position 866. Control then continues to block 1106, as previously described above.

If the determination at block 1110 is false, then control continues to block 1116, where browser 399 determines if the input value equals "site". If the determination at block 1116 is true, then control continues to block 1118, where browser 399 finds the end of "http://" in image-URL field 864. Control then continues to block 1120 where browser 399 finds the position of the next "/" in image-URL field 864. Control then continues to block 1122, where browser 399 stores the position of the next "/" in match-to-position field 866. Control then continues to block 1106, as previously described above.

If the determination at block 1116 is false, then control continues to block 1124 where browser 399 stores the input value in match-to-position field 866. Control then continues to block 1126, where browser 399 sets match-level field 868 to be "custom". Control then continues to block 1108, where the function returns.

Figure 12:
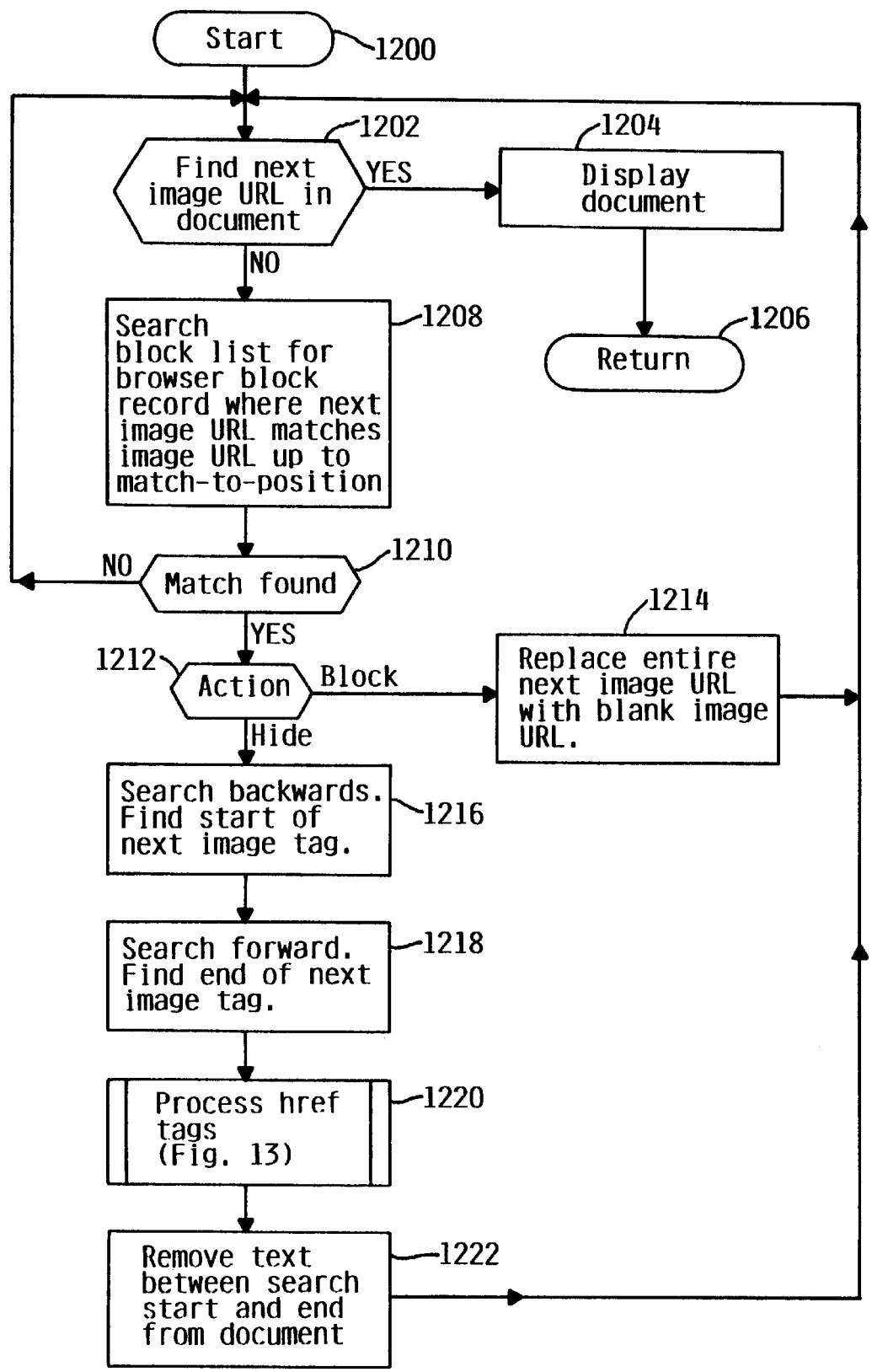

Referring to FIG. 12, there is illustrated sample logic that processes the downloaded document through blocking list 310 and re-displays it on display screen 114. Control starts at block 1200. Control then continues to block 1202 where browser 399 finds the next-image-URL in downloaded document 850 and determines if the end of the document has been reached. A sample document is shown as page 850 in FIG. 8. Referring again to FIG. 12, if the end of the document has been reached, then browser 399 continues to block 1204 where it displays the viewable object for document 850 on display screen 114. A sample viewable object is shown in FIG. 7a, as described above. Referring again to FIG. 12, control then continues to block 1206, where the function returns. If the determination at block 1202 is false, then control continues to block 1208 where browser 399 searches blocking list 310 for an entry such that image-URL field 864 matches the full address of the next-image-URL through the value in match-to-position field 866. Control then continues to block 1210, where browser 399 determines if a match was found at block 1208. If the determination at block 1210 is false, then control returns to block 1202, where browser 399 continues through the rest of document 850.

If the determination at block 1210 is true, then a match has been found and control continues to block 1212, where browser 399 determines whether action field 872 in the matched entry in blocking list 310 has a value of "hide" or "block". If the determination at block 1212 yields "block", then browser 399 replaces the entire next-image-URL in the downloaded copy of document 850 with an image tag that points to a file that contains blank icon 706, as previously described under the description for FIG. 7c. Referring again to FIG. 12, control then returns to block 1202, as previously described above.

If the determination at block 1212 yields "hide", then control continues to block 1216, where browser 399 searches backwards through document 850 from next-image-URL until it finds the start of next-image-URL control tag. Control then continues to block 1218, where browser 399 searches forward until it finds the end of next-image-URL tag. Control then continues to block 1220, where browser 399 processes any "href" tags within the next-image-URL control tag, as further described below under the description for FIG. 13. Control then continues to block 1222, where browser 399 removes the text between the search start and end from document 850. Control then returns to block 1202, as previously described above.

Figure 13:
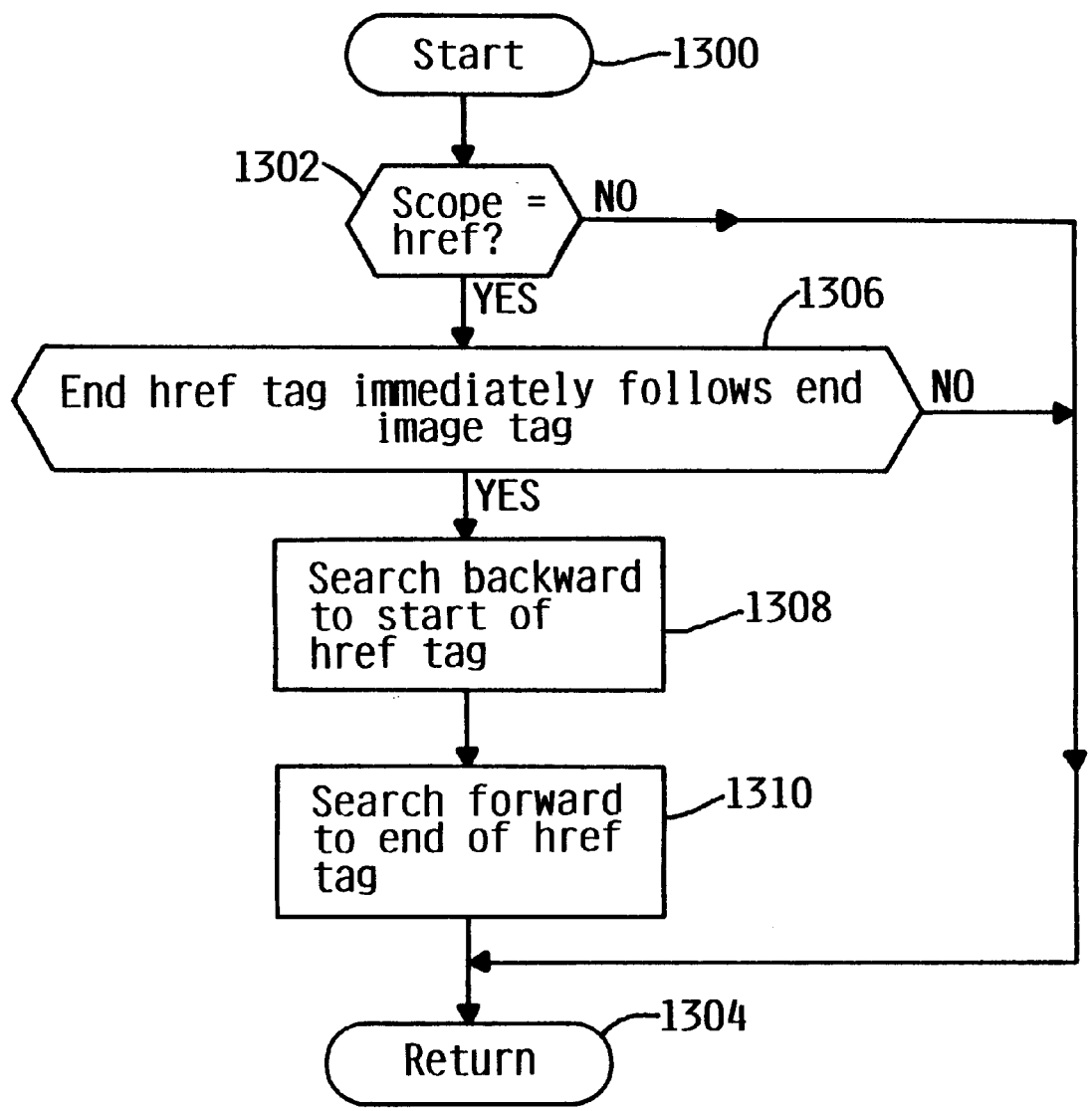

Referring to FIG. 13, there is illustrated sample logic that processes "href" tags. Control starts at block 1300. Control then continues to block 1302, where browser 399 determines whether scope field 870 contains the contents "href".

If the determination at block 1302 is false, then control continues to block 1304 where the function returns.

If the determination at block 1302 is true, then control continues to block 1306 where browser 399 determines whether the end-href tag immediately follows the end-image tag in document 850. The end-image tag in document 850 in FIG. 8 is shown as "</a>".

Referring again to FIG. 13, if the determination at block 1306 is false, then control continues to block 1304 where the function returns. The result of this processing for "href" will remove the entire "href" tag when the image tag of interest is embedded within the href tag and the image tag of interest is the last thing within the href tag.

If the determination at block 1306 is true, then control continues to block 1308 where browser 399 searches backward within document 850 until it finds the start of the href tag. Control then continues to block 1310 where browser 399 searches forward from the start of the href tag that was previously found in block 1308 until it reaches the end of the href tag. Control then continues to block 1304 where the function returns the position of the start of the href tag and the position of the end of the href tag.

Figure 14A:
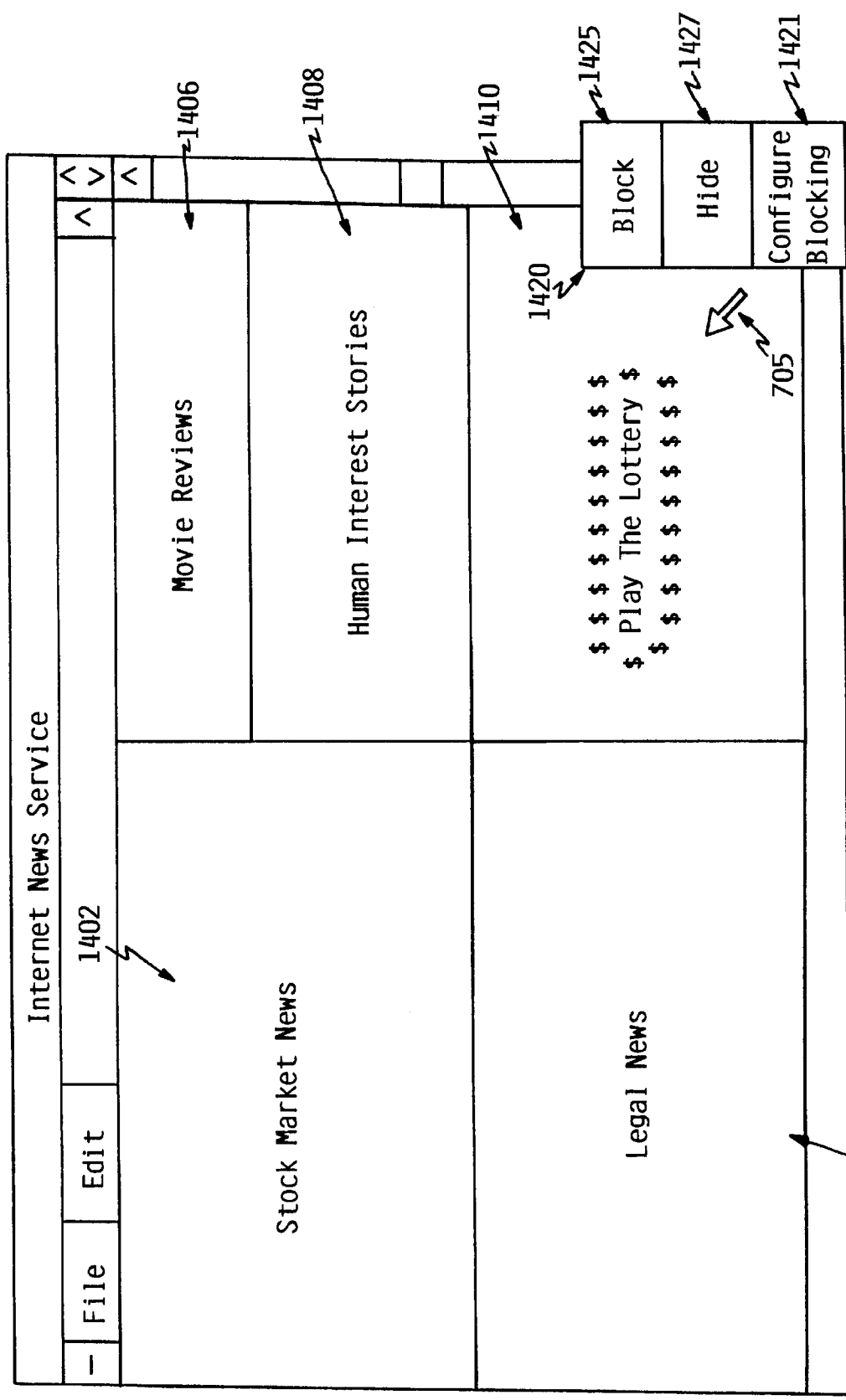
FIG. 14a is a pictorial representation of the interfaces that are used to control the operations of an alternative embodiment.

Referring to FIG. 14a, there is illustrated a pictorial representation of the interfaces used to control the operation of an alternative embodiment. In this embodiment, news and advertisements are presented to the user in multiple windows 1402, 1404, 1406, 1408, and 1410 on display screen 114. A browser or application manager downloads from a server a document that contains control tags and data that describe the windows and their contents. The document may be in any form, such a file or files, packets of data, or a data stream.

When the user selects window 1410 with pointer 705, application-blocking manager 398 displays pop-up dialog 1420, which contains options "block" 1425, "hide" 1427, and "configure blocking" 1421. In an alternative embodiment, the user could select window 1410 with any manner of pointing device, or a combination of pointing devices, or a combination of a pointing device 118 and keyboard 116. In response to the user selecting block 1425 or hide 1427, application-blocking manager 398 will block or hide window 1410, as further described below under the description for FIGS. 14b, 17a, and 19.

Configure blocking 1421 allows the user to control the configuration of the blocking function. When the user selects configure blocking 1421, application-blocking manager 398 displays and processes a dialog, as shown in the example of FIG. 15, below.

Figure 14B:
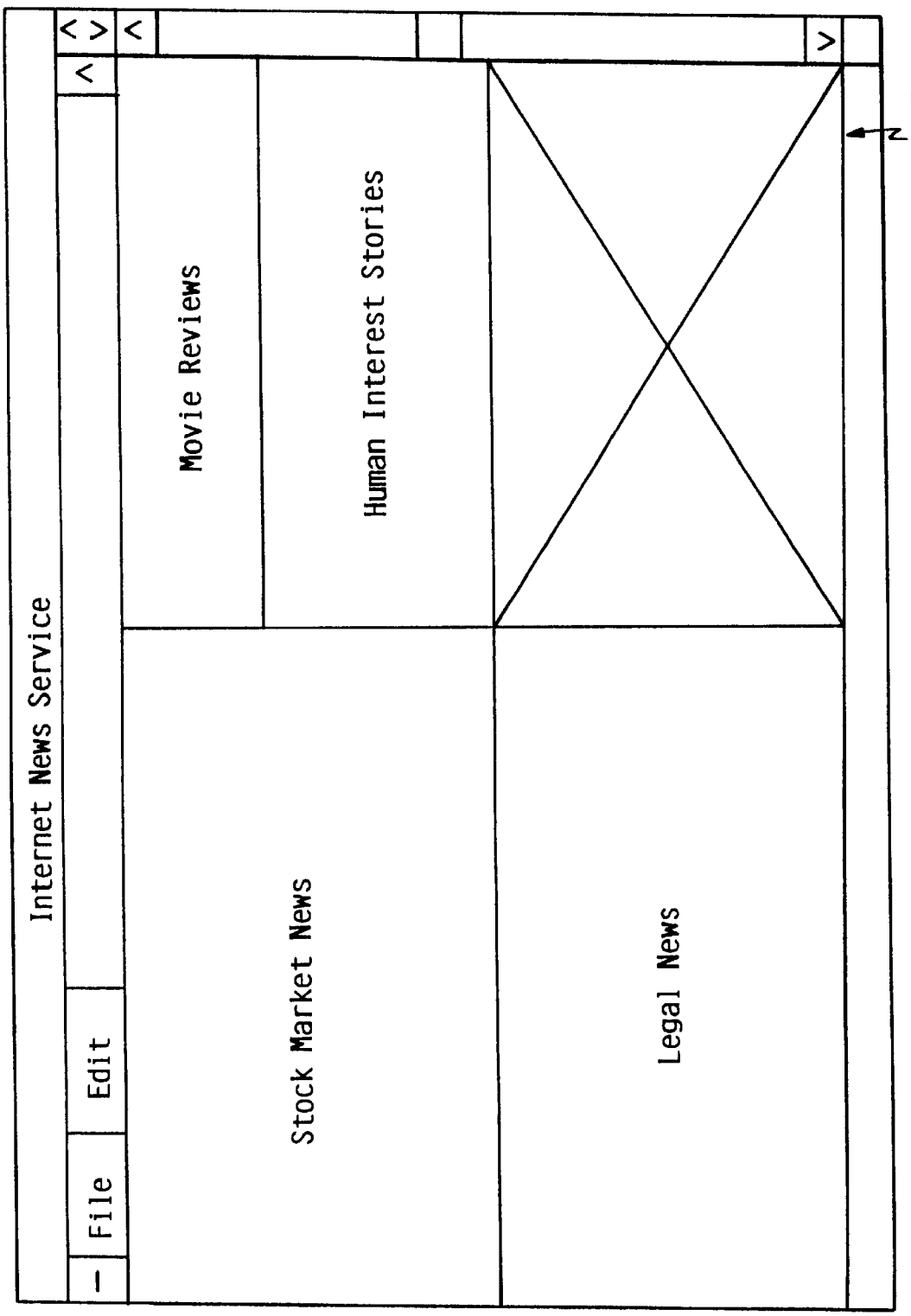
FIG. 14b is a pictorial representation of a display screen after blocking a window, according to an alternative embodiment.

Referring to FIG. 14b, there is illustrated a pictorial representation of a display screen after blocking a window, according to the preferred embodiment. The user previously selected window 1410 and selected block option 1425, as shown in FIG. 14a above. Referring again to FIG. 14b, in response to the user's request, application-blocking manager 198 displayed blocking window 1415, indicating the location at which the window would have been placed had it not been blocked, as further described below under the description for FIGS. 17a, 18, and 19.

Figure 15:
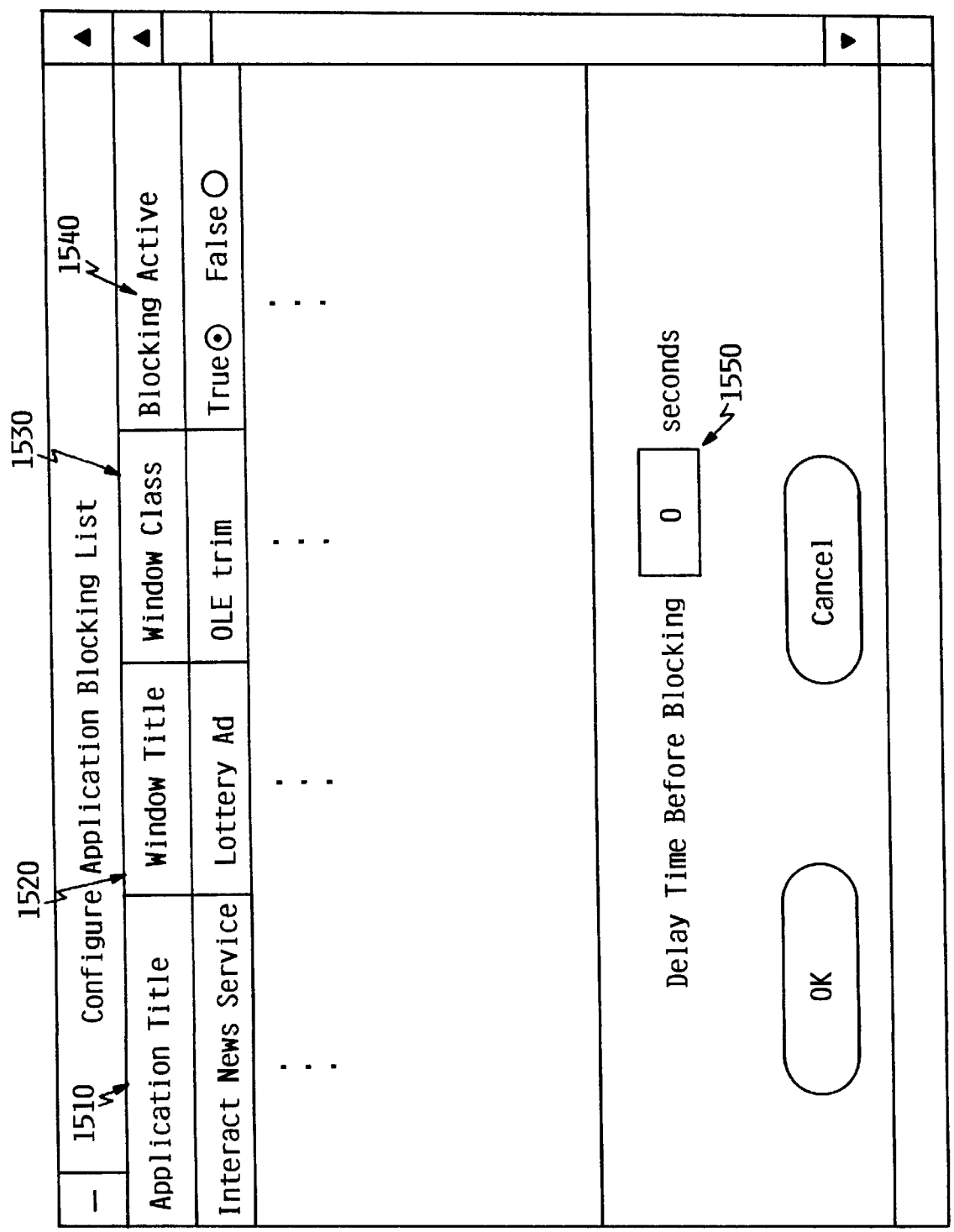
FIG. 15 is a pictorial representation of an interface used to control the operation of an alternative embodiment.

Referring to FIG. 15, there is illustrated a pictorial representation of the interfaces presented by application-blocking manager 398 when the user selects configure blocking option 1421, as described above under the description for FIG. 14a. Referring again to FIG. 15, application-blocking manager 398 has displayed selected fields from application-blocking list 309. These fields are application title 1510, window title 1520, window class 1530, and blocking active 1540. In addition, application-blocking manager 398 has displayed delay field 1550, which applies globally to all records in application-blocking list 309. Application title 1510, window title 1520, and window class 1530 serve to identify the window to the user, and may not be modified by the user, in the preferred embodiment.

Application title 1510 contains the title of the parent application that owns the window being blocked. In this example, the value of application title 1510 in the displayed record is "Internet News Service".

Window title 1520 contains the title of the window that is being blocked. In this example, the value of window title 1520 in the displayed record is "Lottery Ad".

Window class 1530 contains a description of the class to which the window belongs and serves to match and identify the window. Window class 1530 is available from operating system 390. In this example, the value in window class 1530 in the displayed record is "OLE trim".

Blocking active 1540 contains an indication of whether the window is selected for blocking. When the user selects a window and chooses block 1425 or hide 1427, as previously described in FIG. 14, application-blocking manager 398 sets blocking active in application-blocking list 309 to be true, but the user can later change it using blocking-active field 1540. In this example, the value in active 1540 in the displayed record is true.

Delay field 1550 contains the number of seconds that the user wishes the selected window to be displayed on the screen before it is blocked or hidden. As shown in FIG. 15, the default value for delay field 1550 is "0", meaning that there is no delay, so the selected window will not be displayed. The processing for delay field 1550 is further described below under the description for FIG. 17a.

Figure 16:
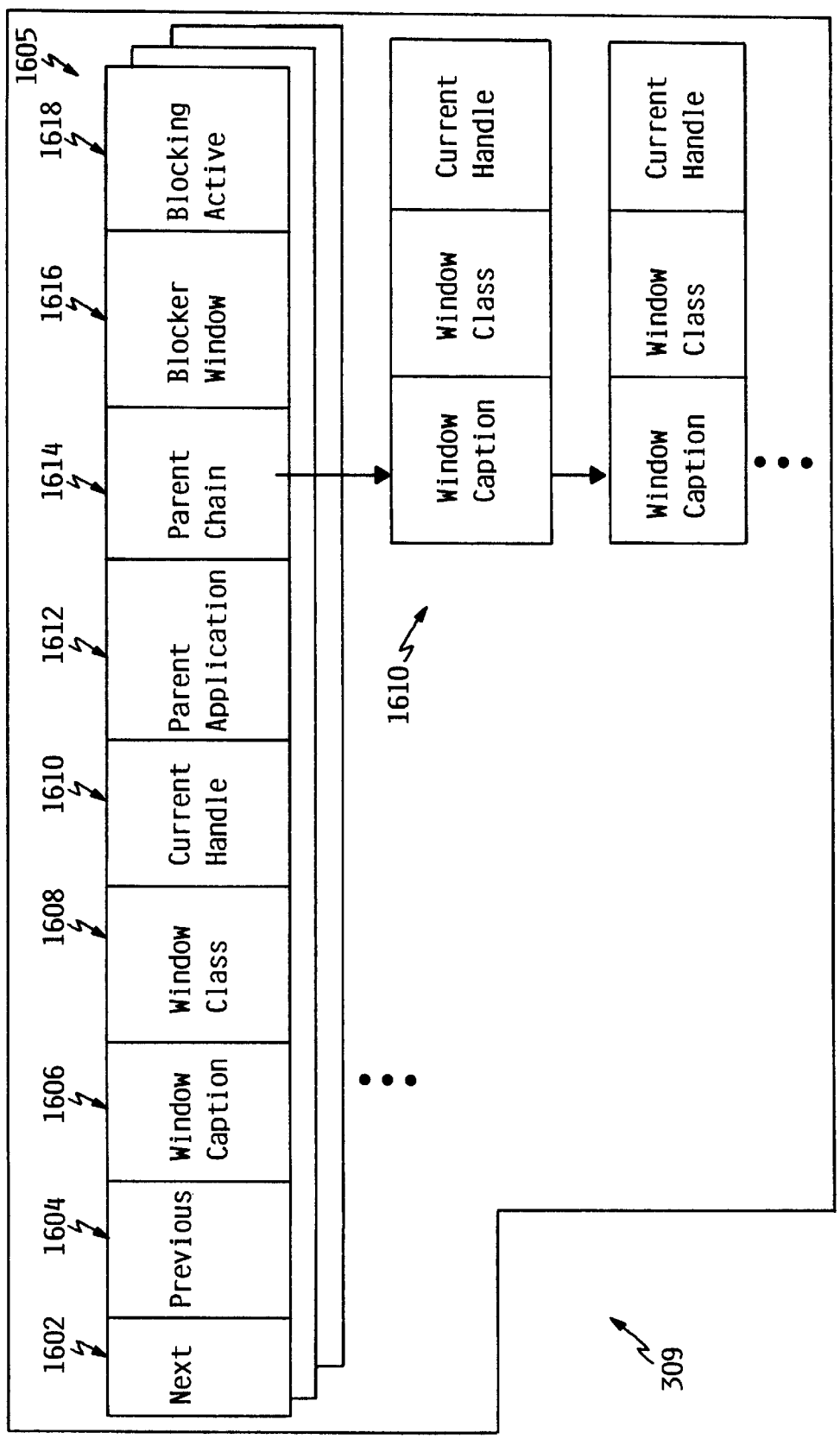
FIG. 16 is a block diagram of the data structures of an alternative embodiment.
Figures 1, 17A:
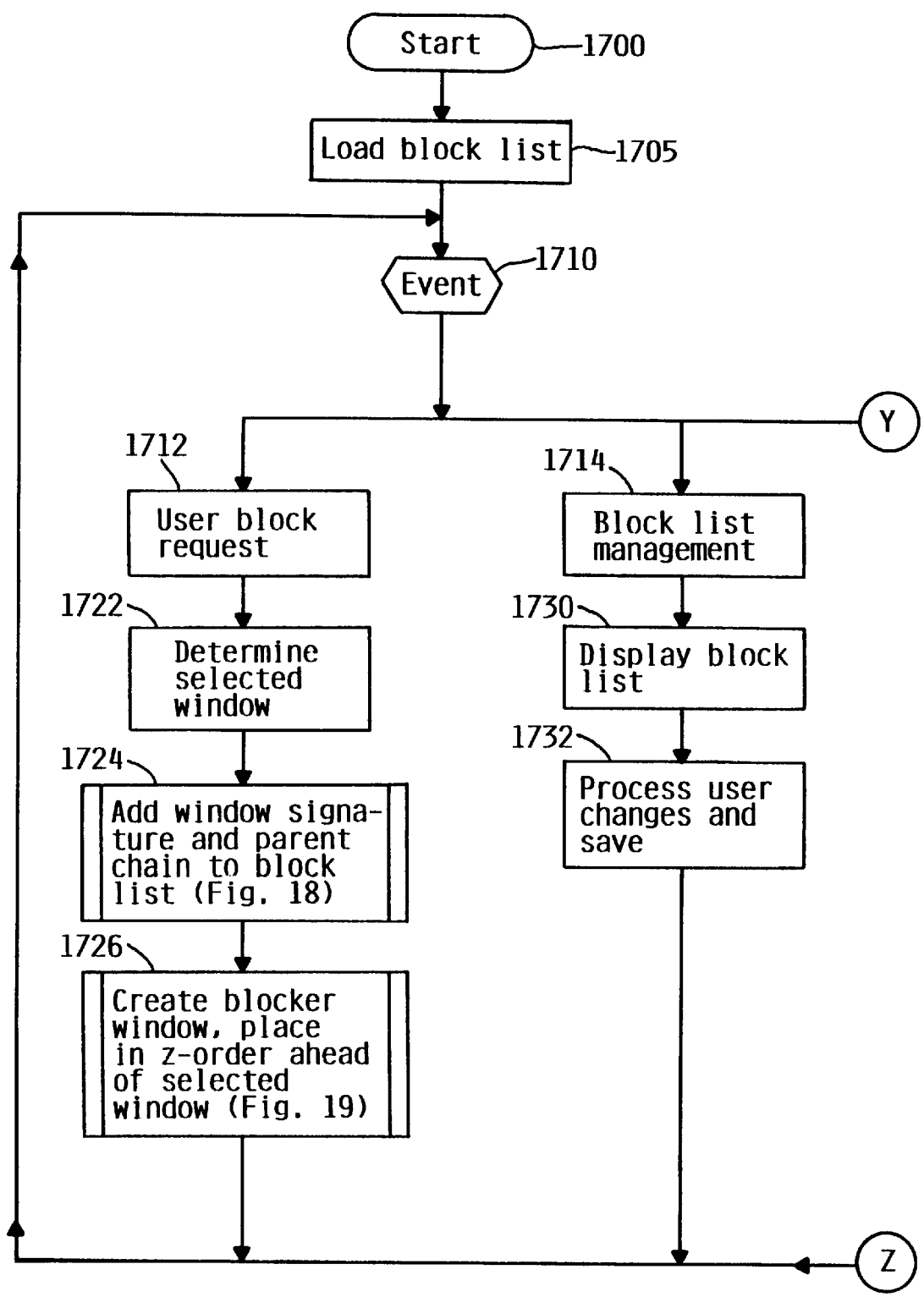
FIGS. 17a, 17b, 18, 19, 20, and 21 are flow charts that describe the operation of an alternative embodiment.
Figures 2, 17A:
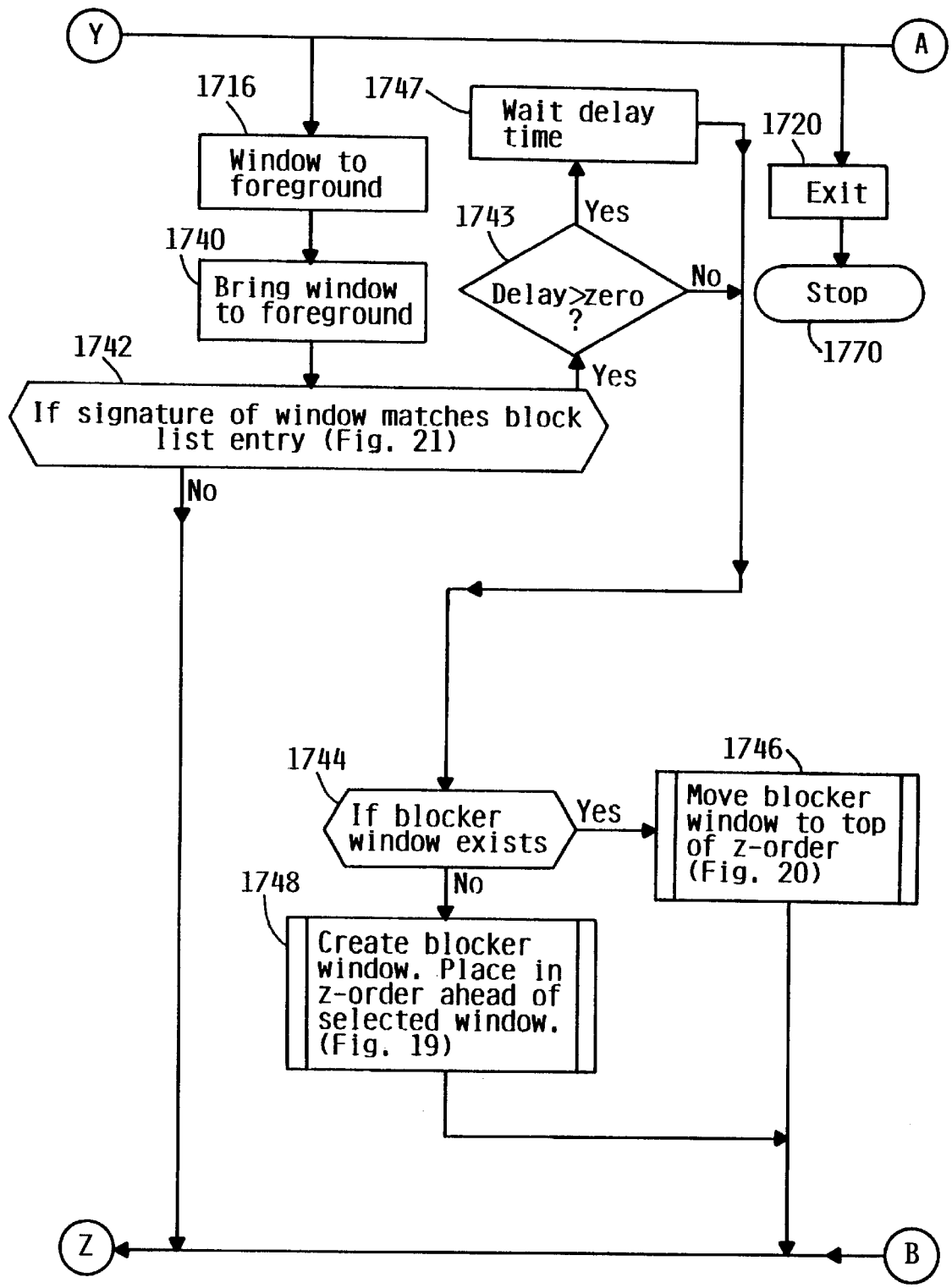
Figure 17B:
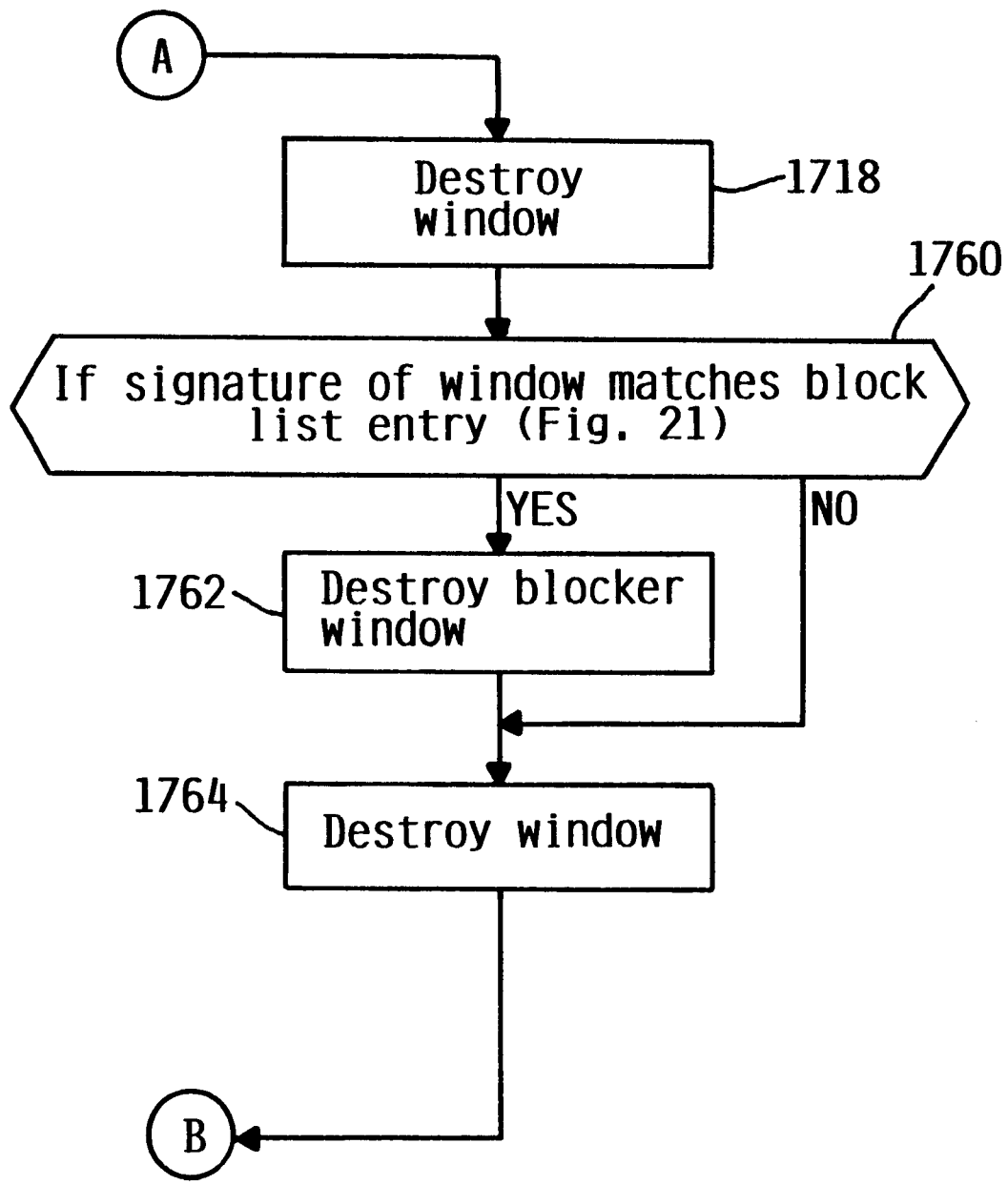

Referring to FIG. 16, there is illustrated a block diagram of the data structures used in an alternative embodiment. Application-blocking list 309 is a data structure maintained by application-blocking manager 398. Application-blocking list 309 contains lists of window records 1605 and parent records 1610.

Window records 1605 are records for windows that are to be blocked. Each window record 1605 contains next-pointer field 1602, previous-pointer field 1604, window-caption field 1606, window-class field 1608, current-handle field 1610, parent-application field 1612, parent-chain field 1614, blocker-window field 1616, and active field 1618.

Next-pointer field 1602 contains to the next record in application-blocking list 309. Previous-pointer field 1604 contains a pointer to the previous record in application-blocking list 309. Window-caption field 1606 contains a caption of the window being blocked. Window-class field 1608 contains the class of the window being blocked. Current-handle field 1610 contains the current handle of the window being blocked. Parent-application field 1612 contains an identifier of the parent application that owns the window being blocked. Parent-chain field 1614 contains a pointer to the parent record list 1610 for this window record. Each window record has its own list of parent records. Blocker-window field 1616 contains an identifier of the blocker window. Blocking active field 1618 contains an indication of whether the window is selected for blocking.

FIGS. 17–21 illustrate flowcharts that describe the operation of an alternative embodiment. Referring to FIGS. 17a and 17b, there is illustrated the main logic of application-blocking manager 398. At block 1700, application-blocking manager 398 starts. Control then continues to block 1705 where application-blocking manager 398 loads application-blocking list 309. Control then continues to block 1710 where application-blocking manager 398 gets the next operation requested by the user and determines which operation the user requested.

The user can request a blocking operation 1712, an application-blocking list management operation 1714, a window to foreground operation 1716, a destroy window operation 1718, or an exit operation 1720.

A blocking operation 1712 is requested by the user by selecting an application window on display screen 114 and choosing block options 1411 as previously described under the description for FIG. 14. Referring again to FIG. 17, when the user selects this operation, control continues to block 1722 where application-blocking manager 398 determines which window was selected by the user. Control then continues to block 1724 where application-blocking manager 398 adds the selected window signature and its parent chain to application-blocking list 309, as further described below under the description for FIG. 18. Control then continues to block 1726 where application-blocking manager 398 creates blocking window 1415 and places it in z-order ahead of the user-selected window, as previously described above under the description for FIG. 14 and as further described below under the description for FIG. 19. Referring again to FIG. 17, control then returns to block 1710 where application-blocking manager 398 processes the next user request, as described above.

When application-blocking manager 398 determines at block 1710 that the user has requested a block list management operation, then control continues to block 1730. The user can request such an operation by selecting the configure application blocking list option 1421, as described above under the description for FIG. 14. Referring again to FIG. 17, at block 1730, application-blocking manager 398 displays the contents of application-blocking list 309 to the user and updates the user-entered fields into application-blocking list 309. The user can also remove entries from application-blocking list 309, in which case the window associated with the window title field that has been blocked will no longer be blocked. Such a user interface is described above under the description for FIG. 15. Referring again to FIG. 17, control then returns to block 1710, as described above.

When application-blocking manager 398 determines at block 1710 that the user has requested a window-to-foreground operation, via operating system 390, then control continues to block 1740 where application-blocking manager 398 brings the selected window to the foreground. Control then continues to block 1742 where application-blocking manager 398 determines whether the signature of the selected window matches any entry in application-blocking list 309.

If the determination at block 1742 is false, then control returns to block 1710 as previously described above.

If the determination at block 1742 is true, then control continues to block 1743 where application-blocking manager 398 determines whether the user entered a delay time (shown at delay 1550 in FIG. 15) greater than zero. If the determination at block 1743 is true, then control continues to block 1747 where application-blocking manager 398 waits the specified time and then continues to block 1744. If the user requests an operation while application-blocking manager 398 is waiting at block 1747, application-blocking manager 398 will jump back to block 1710 to process the request. If the determination at block 1743 is false, then control continues directly to block 1744. At block 1744, application-blocking manager 398 determines whether a blocking window exists.

If the determination at block 1744 is true, then control continues to block 1746 where application-blocking manager 398 moves the blocking window to the top of z-order as further described below under the description for FIG. 20, below. Control then returns to block 1710 as previously described above.

If the determination at block 1744 is false, then control continues to block 1748 where application-blocking manager 398 creates a blocking window and places it in the z-order ahead of the user-selected window, as described below under the description for FIG. 19. Control then returns to block 1710 as previously described above.

When application-blocking manager 398 determines at block 1710 that the user has requested a destroy window operation, then control continues to block 1760. At block 1760, application-blocking manager 398 determines whether the signature of the window that the user has selected to destroy matches any entry in application-blocking list 309, as further described below under the description for FIG. 21. If the determination at block 1760 is true, then application-blocking manager 398 destroys the blocking window at block 1762 and destroys the user-selected window at block 1764. Control then returns to block 1710 as previously described above.

If the determination at block 1760 is false, then application-blocking manager 398 destroys the user-selected window at block 1764, after which control returns to block 1710, as previously described above.

When application-blocking manger 398 determines that the user has requested to exit, then control stops at block 1770.

Figure 18:
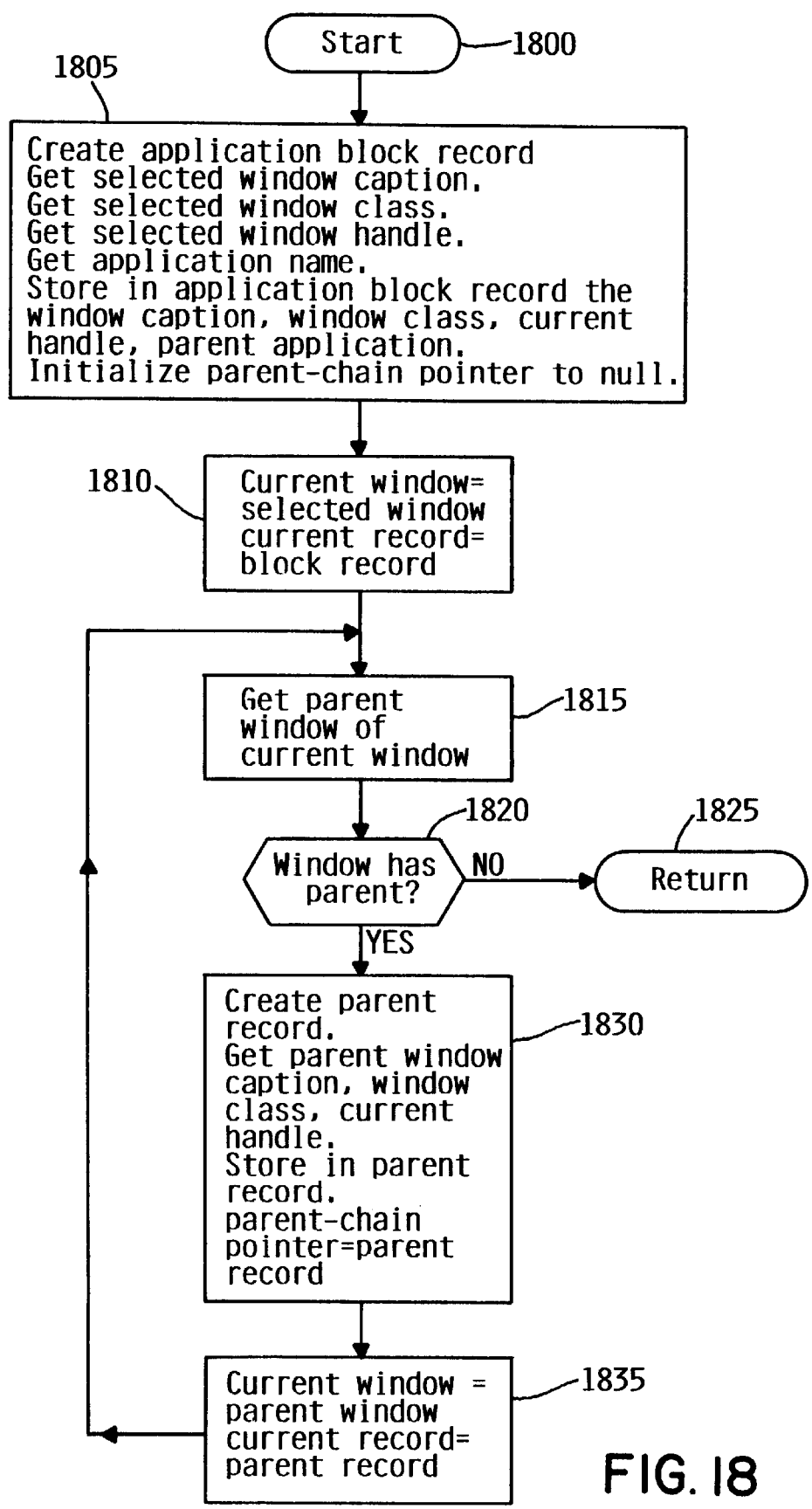

Referring to FIG. 18, there is illustrated sample logic that adds a window signature to application-blocking list 309. At block 1800, control starts. Control then continues to block 1805, where application-blocking manager 398 creates a new application-blocking record in application-blocking list 309. Application-blocking manager 398 then retrieves, from the window that the user selected, the window caption, the window class, the window handle, and the application name. Application-blocking manger 398 then stores these retrieved values in window-caption field 1606, window-class field 1608, current-handle field 1610, and parent-application field 1612, respectively, in the entry that was just created in application-blocking list 309. Application-blocking manger 398 then initializes parent-chain field 1614 to null. Control then continues to block 1810 where application-blocking manager 398 sets the current window to be the user-selected window and sets the current record to be the blocked record in application-blocking list 309.

Control then continues to block 1815, where application-blocking manager 398 determines the parent window of the current window using operating system 390. Control then continues to block 1820, where application-blocking manger 398 determines whether the current window has a parent. If the determination at 1820 is false, then control continues to block 1825, where the function returns.

If the determination at block 1820 is true, then control continues to block 1830, where application-blocking manager 398 creates a parent record for the record that was previously created at block 1805. Application-blocking manger 398 then retrieves from the parent window the window caption, the window class, the window handle, and stores them in the parent record in window-caption field 1606, window-class field 1608, and current-handle field 1610. Application-blocking manager 298 also sets parent-chain pointer 1614 to point to the newly created parent record. (It is not necessary to put the application name for the parent record in parent-application 1612 because, in the preferred embodiment, all windows in a parent chain belong to the same application.) Control then continues to block 1835, where application-blocking manager 398 sets the current window to be the parent window and sets the current record to point to the parent record. Control then returns to block 1815, as previously described above.

Figure 19:
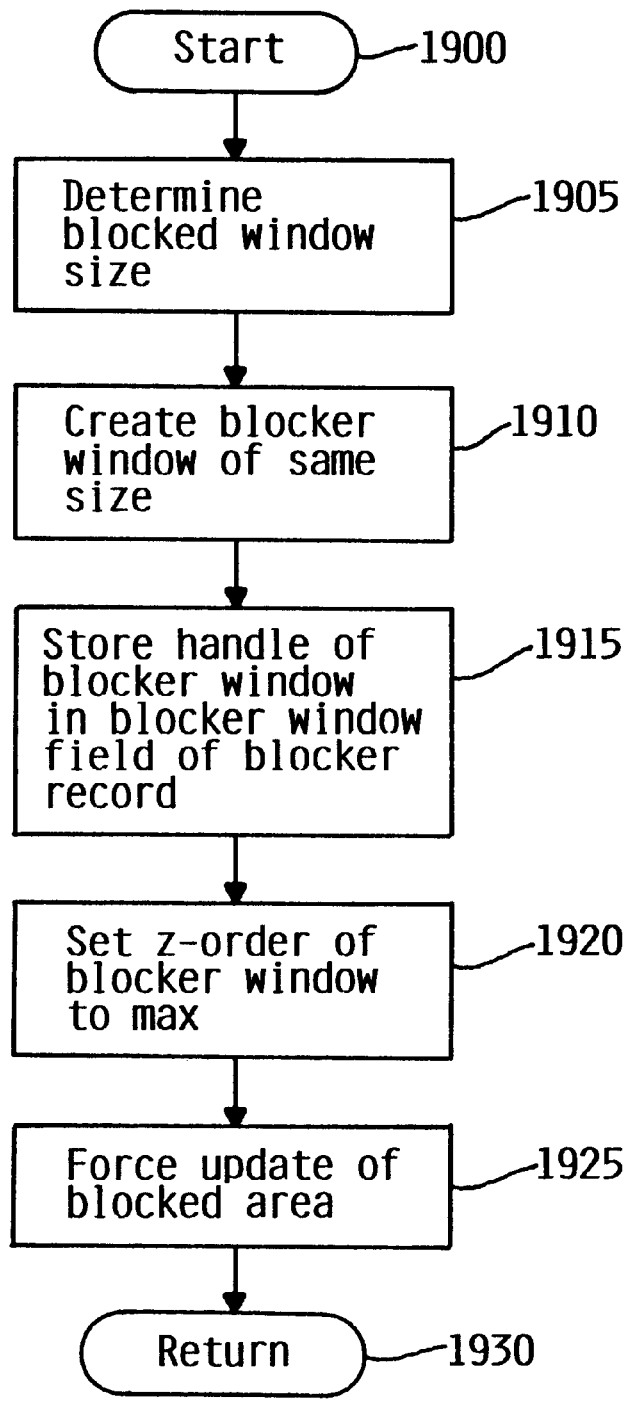

Referring to FIG. 19, there is illustrated sample logic that creates a blocking window and places it in z-order ahead of the user-selected window. At block 1900, control starts. Control then continues to block 1905, where application-blocking manager 398 determines the blocked-window size. Control then continues to block 1910, where application-blocking manager 398 creates a blocking window of the same size as the window to be blocked. Control then continues to block 1915, where application-blocking manager 398 stores the handle of the blocking window in blocker-window field 1616 of the block record in application-blocking list 309 that is to be blocked. Control then continues to block 1920, where application-blocking manager 398 sets the z-order of the blocking window that was created at block 1910 to be the maximum. Control then continues to block 1925, where application-blocking manager 398 forces an update of the block area. Control then continues to block 1930, where the function returns.

Figure 20:
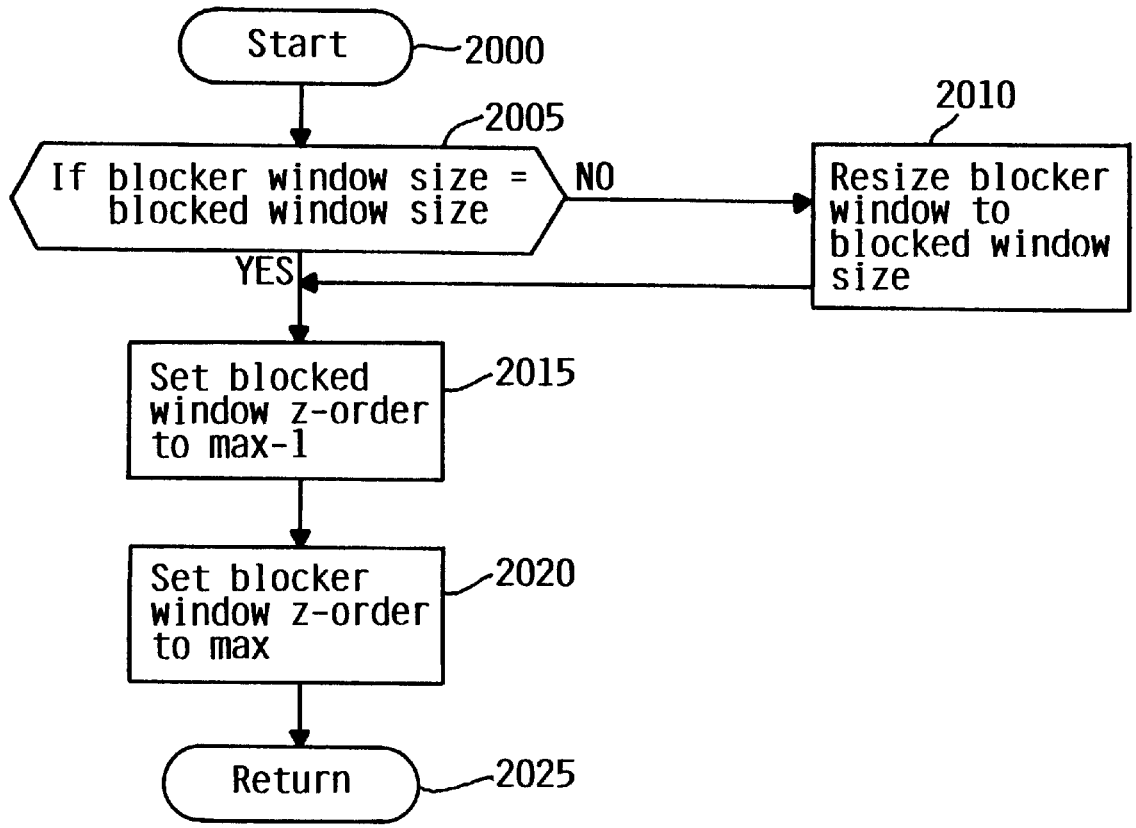

Referring to FIG. 20, there is illustrated sample logic that moves the blocking window to the top of the z-order. At block 2000, control starts. Control then continues to block 2005, where application-blocking manager 398 determines if the blocker-window size equals the blocked-window size. If the determination at block 2005 is false, then control continues to block 2010, where application-blocking manager 398 resizes the blocking window to be the blocked-window size. Control then continues to block 2015, where application-blocking manager sets the blocked-window z-order to be the maximum z-order minus one. Control then continues to block 2020, where application-blocking manager sets the blocking window z-order to be the maximum z-order. Control then continues to block 2025, where the function returns.

If the determination at block 2005 is true, then control continues directly to block 2015, as previously described above.

Figure 21:
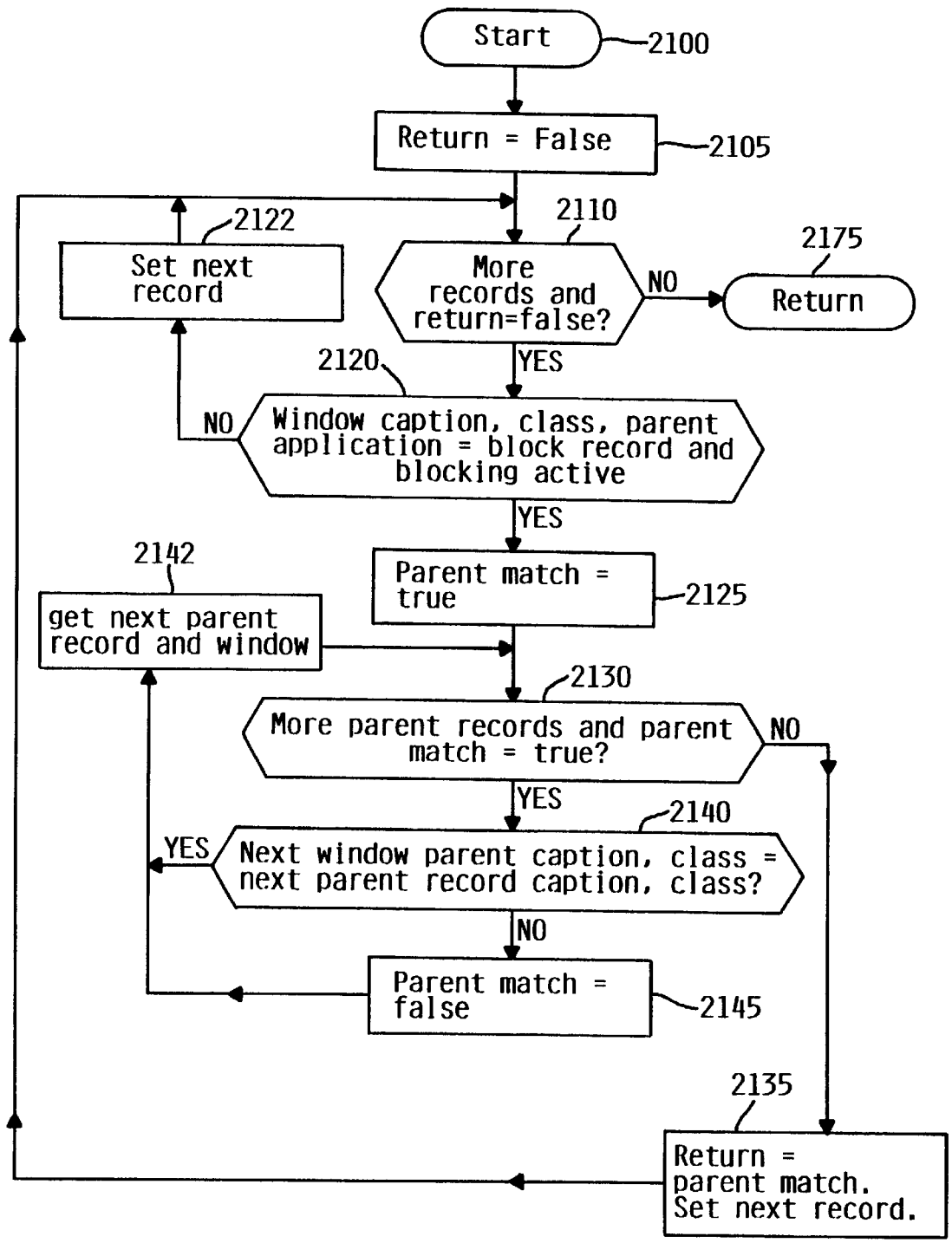

Referring to FIG. 21, there is illustrated sample logic that determines whether the signature of a selected window matches an application-blocking record in application-blocking list 309. At block 2100, control starts. Control then continues to block 2105, where application-blocking manager 398 initializes the return value to be false. Control then continues to block 2110, where application-blocking manager 398 determines whether there are more records left to be processed in application-blocking list 309 and whether the return value equals false. If the determination at block 2110 is false, the control continues to block 2175, where the function returns.

If the determination at block 2110 is true, then control continues to block 2120, where application-blocking manager 398 determines whether the window caption, the window class, and the parent application of the selected window equals window-caption field 1606, window-class field 1608, and parent-application field 1612 in the current record of application-blocking list 309. Also in block 2120, application-blocking manager 398 determines whether blocking active 1618 is true. If the determination at block 2120 is false, then application-blocking manager 398 finds the next record in application-blocking list 309 using next field 1602 at block 2122 and returns to block 2110, as previously described above. If the determination of block 2120 is true, then control continues to block 2125, where application-blocking manager 398 sets the parent-match variable to be true. Control then continues to block 2130, where application-blocking manager 398 determines whether there are still more parent records associated with this entry in application-blocking list 309 and whether the parent-match variable is set to be true.

If the determination at block 2130 is false, then control continues to block 2135, where application-blocking manager 398 sets the return value to equal the contents of the parent-match variable and finds the next record in application-blocking list 309 using next field 1602. Control then returns to block 2110, as previously described above.

If the determination at block 2130 is true, then control continues to block 2140, where application-blocking manager 398 determines whether the next window parent caption and class equals the next parent record caption and class. If the determination at block 2140 is true, then control finds the next parent window using parent-chain field 1614 and the next record using next field 1602 at block 2142 and returns to block 2130, as previously described above. If the determination at block 2140 is false, then control continues to block 2145, where application-blocking manager 398 sets the variable "parent-match" to be false. Control then returns to block 2130, as described above.

While this invention has been described with respect to the preferred and alternative embodiments, it will be understood by those skilled in the art that various changes in detail may be made therein without departing from the spirit, scope, and teaching of the invention. For example, browsers may become widely employed in consumer applications such as operator panels for consumer electronics, appliances, and automobiles. Accordingly, the herein disclosed invention is to be limited only as specified in the following claims.

What is claimed is:

1. A method for displaying a document on a display screen, wherein the display of the document generates a plurality of images on the display screen, comprising the computer-executed steps of:

generating an unmodified version of said document, said unmodified version containing said plurality of images, for display on said display screen;

interactively receiving a user selection of a first image of said plurality of images displayed on the display screen to be blocked;

saving said user selection for subsequent use, wherein said saving step comprises:

(a) responsive to said user selection, finding a first control tag in the document, wherein the first control tag identifies the first image, and (b) storing the first control tag in a blocking list;

subsequently generating a modified version of said document, said modified version being without said first image, wherein the subsequent generating a modified version step searches the blocking list for a stored tag that matches the first control tag in the document; and displaying the modified version of said document.

2. The method of claim 1, wherein the subsequently generating a modified version step further comprises:

displaying blank space in place of the first image.

3. The method of claim 1, wherein the subsequently generating a modified version step further comprises:

displaying a blocking icon in place of the first image.

4. The method of claim 1, further comprising:

blocking the display of the first image when a second document is subsequently displayed, wherein the second document also contains the stored control tag.

5. The method of claim 1, wherein the first control tag further comprises information that describes the formatting of the first image.

6. The method of claim 1, wherein the first control tag further comprises an address of a second document, wherein the second document contains first image data.

7. The method of claim 6, wherein the address further comprises an address of a directory containing the second document, further comprising:

blocking the display of all images residing in the directory.

8. The method of claim 6, wherein the address further comprises an address of a site containing the second document, further comprising:

blocking the display of all images residing at the site.

9. The method of claim 1, wherein the first image is a window.

10. The method of claim 1, wherein the first control tag further comprises a window signature.

11. The method of claim 1, further comprising:

displaying the first image for a delay time prior to the blocking step.

12. A apparatus that displays a document on a display screen, wherein the display of the document generates a plurality of images on the display screen, comprising:

a processor;

memory coupled to the processor;

a browser, residing in the memory, wherein the browser:

(a) displays an unmodified version of a document on a display screen, the unmodified version containing a plurality of images, (b) interactively receives a user selection of a first image of said plurality of images on the display screen to be blocked, (c) responsive to the user selection, finds a first control tag in the document and stores the first control tag in a blocking list, wherein the first control tag identifies the first image, and (d) subsequently generates and displays a modified version of the document by searching the blocking list for a stored tag that matches the first control tag in the document, and in response to finding a match, the browser blocks the display of the first image in the modified version of the document.

13. The apparatus of claim 12, wherein the browser further displays blank space in place of the first image.

14. The apparatus of claim 12, wherein the browser further displays a blocking icon in place of the first image.

15. The apparatus of claim 12, wherein the browser further blocks the display of the first image when a second document is subsequently displayed, wherein the second document also contains the stored control tag.

16. The apparatus of claim 12, wherein the first control tag further comprises information that describes the formatting of the first image.

17. The apparatus of claim 12, wherein the first control tag further comprises an address of a second document, wherein the second document contains first image data.

18. The apparatus of claim 17, wherein the address further comprises an address of a directory containing the second document, and wherein the browser, further blocks the display of all images residing in the directory.

19. The apparatus of claim 17, wherein the address further comprises an address of a site containing the second document, and wherein the browser further blocks the display of all images residing at the site.

20. The apparatus of claim 12, wherein the first image is a window.

21. The apparatus of claim 12, wherein the browser further displays the first image for a delay time prior to blocking.

22. A program product that displays a document on a display screen, wherein the display of the document generates a plurality of images on the display screen, comprising:

a browser that: (a) displays an unmodified version of a document on a display screen, the unmodified version containing a plurality of images, (b) interactively receives a user selection of a first image of said plurality of images on the display screen to be blocked, (c) responsive to the user selection, finds a first control tag in the document and stores the first control tag in a blocking list, wherein the first control tag identifies the first image, and (d) subsequintly generates and displays a modified version of the document by searching the blocking list for a stored tag that matches the first control tag in the document, and in response to finding a match, the browser blocks the display of the first image in the modified version of the document; and signal-bearing media bearing the browser.

23. The program product of claim 22, wherein the browser further displays blank space in the place of the first image.

24. The program product of claim 22, wherein the browser further displays a blocking icon in place of the first image.

25. The program product of claim 22, wherein the browser further blocks the display of the first image when a second document is subsequently displayed, wherein the second document also contains the stored control tag.

26. The program product of claim 22, wherein the first control tag further comprises information that describes the formatting of the first image.

27. The program product of claim 22, wherein the first control tag further comprises an address of a second document, wherein the second document contains first image data.

28. The program product of claim 27, wherein the address further comprises an address of a directory containing the second document, and wherein the browser, further blocks the display of all images residing in the directory.

29. The program product of claim 27, wherein the address further comprises an address of a site containing the second document, and wherein the browser further blocks the display of all images residing at the site.

30. The program product of claim 22, wherein the first image is a window.

31. The program product of claim 22, wherein the browser further displays the first image for a delay time prior to blocking.

32. The program product of claim 22, wherein the document is an Internet web page.

* * * * *